United States Patent
Suzuki et al.

(10) Patent No.: US 11,411,522 B2
(45) Date of Patent: Aug. 9, 2022

(54) LINEAR MOTOR SYSTEM AND COMPRESSOR

(71) Applicant: Hitachi, Ltd., Tokyo (JP)

(72) Inventors: Takahiro Suzuki, Tokyo (JP); Shuhei Nagata, Tokyo (JP); Wataru Hatsuse, Tokyo (JP); Masaki Koyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 16/992,218

(22) Filed: Aug. 13, 2020

(65) Prior Publication Data

US 2020/0373866 A1 Nov. 26, 2020

Related U.S. Application Data

(62) Division of application No. 16/304,600, filed as application No. PCT/JP2017/014756 on Apr. 11, 2017, now Pat. No. 10,784,809.

(30) Foreign Application Priority Data

May 27, 2016 (JP) .................................. 2016-105754

(51) Int. Cl.
 *H02P 25/064* (2016.01)
 *F04B 49/06* (2006.01)
 (Continued)

(52) U.S. Cl.
 CPC ............ *H02P 25/064* (2016.02); *F04B 35/04* (2013.01); *F04B 35/045* (2013.01); *F04B 49/06* (2013.01);
 (Continued)

(58) Field of Classification Search
 CPC ...... H02P 25/064; H02P 25/032; F04B 35/04; F04B 35/045; F04B 49/06; F04B 49/08;
 (Continued)

(56) References Cited

U.S. PATENT DOCUMENTS

| | | | |
|---|---|---|---|
| 4,706,470 A | * | 11/1987 | Akazawa .............. F25B 31/023 62/228.3 |
| 5,947,693 A | | 9/1999 | Yang |

(Continued)

FOREIGN PATENT DOCUMENTS

| | | |
|---|---|---|
| JP | 56-37441 A | 4/1981 |
| JP | 2002-44977 A | 2/2002 |
| JP | 2004-336988 A | 11/2004 |

OTHER PUBLICATIONS

International Search Report (PCT/ISA/210) issued in PCT Application No. PCT/JP2017/014756 dated Jul. 18, 2017 with English translation (seven (7) pages).

(Continued)

*Primary Examiner* — Burton S Mullins
(74) *Attorney, Agent, or Firm* — Crowell & Moring LLP

(57) ABSTRACT

Controllability of a linear motor or a compressor is improved in a linear motor system that includes: an armature having magnetic poles and winding wires; a mover having a permanent magnet; and a power conversion unit that outputs AC power to the winding wires, in which the mover and the armature are relatively movable, and the mover or the armature is connected to an elastic body. The linear motor system further includes: a position detection unit that detects and outputs the position of the mover with respect to the armature, a position estimation, or a current detection unit that outputs the value of current flowing through the winding wires; and a control unit that controls the output of the power conversion unit on the basis of the output of the position detection unit, the output of the position estimation unit, or the output of the current detection unit.

1 Claim, 16 Drawing Sheets

(51) Int. Cl.
  *F04B 49/08* (2006.01)
  *F04B 35/04* (2006.01)
  *H02P 25/032* (2016.01)
  *H02K 41/03* (2006.01)
(52) U.S. Cl.
  CPC ............ *F04B 49/08* (2013.01); *H02P 25/032* (2016.02); *F04B 2201/0206* (2013.01); *F04B 2203/0404* (2013.01); *F04B 2205/09* (2013.01); *H02K 41/03* (2013.01)
(58) Field of Classification Search
  CPC .......... F04B 2201/0206; F04B 2205/09; F04B 2203/0404; H02K 41/03
  See application file for complete search history.

(56) References Cited

U.S. PATENT DOCUMENTS

| | | |
|---|---|---|
| 5,980,211 A | 11/1999 | Tojo |
| 6,074,172 A | 6/2000 | Huang |
| 6,437,524 B1 | 8/2002 | Dimanstein |
| 6,501,240 B2 | 12/2002 | Ueda |
| 6,746,211 B2* | 6/2004 | Kwon ............ F04B 35/045 417/44.11 |
| 6,753,665 B2 | 6/2004 | Ueda |
| 6,851,934 B2 | 2/2005 | Yoo |
| 6,977,474 B2 | 12/2005 | Ueda |
| 7,151,348 B1 | 12/2006 | Ueda et al. |
| 8,033,795 B2* | 10/2011 | Dainez ............ F04B 35/045 318/687 |
| 9,194,386 B2 | 11/2015 | Hu |
| 2005/0271526 A1 | 12/2005 | Chang |
| 2006/0110259 A1* | 5/2006 | Puff ............ H02K 33/16 417/44.2 |

OTHER PUBLICATIONS

Japanese-language Written Opinion (PCT/ISA/237) issued in PCT Application No. PCT/JP2017/014756 dated Jul. 18, 2017 (five (5) pages).

* cited by examiner

LINEAR MOTOR SYSTEM AND COMPRESSOR

CROSS REFERENCE TO RELATED APPLICATIONS

This application is a Divisional of U.S. application Ser. No. 16/304,600, filed Nov. 26, 2018, which is a 371 of International Application No. PCT/JP2017/014756, filed Apr. 11, 2017, which claims priority from Japanese Patent Application No. 2016-105754, filed May 27, 2016, the disclosures of which are expressly incorporated by reference herein.

TECHNICAL FIELD

The present invention relates to linear motor systems and compressors.

BACKGROUND ART

Patent Document 1 discloses a configuration in which a drive voltage V having an angular frequency ω to a linear motor, a phase difference θ between a counter electromotive force E and the drive voltage V generated in the linear motor is detected, and the angular frequency ω is controlled to make a phase difference φ between a drive current I and E practically zero, where φ is given by $\phi=\tan^1[V \sin \theta/(V \cos \theta-E)]-\tan^1 (\omega L/R)$ using V, ω, the inductance L and the resistance R of the magnet coil of the linear motor, E, and θ (claim 1, claim 2, and the like of PLT 1).

CITATION LIST

Patent Document

Patent Document 1: Japanese Patent Application Laid-Open No. 2002-44977

SUMMARY OF THE INVENTION

Technical Problem

In Patent Document 1, the phase difference φ is used as an evaluation function for controlling ω, and φ is dependent on the inductance of the coil of the linear motor and the like. However, the inductance is a variable dependent on twice the value of the phase of the mover of the linear motor (2θ). As a result, the evaluation function is a function including θ and 2θ, therefore it is not easy to control w with high accuracy.

Solution to Problem

A first aspect of the present invention that is achieved with the above-described problem in mind is a linear motor system that includes: an armature having magnetic poles and winding wires; a mover having a permanent magnet; and a power conversion unit that outputs AC power to the winding wires, in which the mover and the armature are relatively movable, and the mover or the armature is connected to an elastic body. The linear motor system further includes: a position detection unit that detects and outputs the position of the mover with respect to the armature, a position estimation unit that estimates and outputs the position of the mover with respect to the armature, or a current detection unit that outputs the value of current flowing through the winding wires; and a control unit that controls the output of the power conversion unit on the basis of the output of the position detection unit, the output of the position estimation unit, or the output of the current detection unit. In the case where a signal having a frequency substantially the same as the frequency of the AC power is applied to the output of the position detection unit, to the output of the position estimation unit, or to the output of the current detection unit, the control unit changes the frequency of the AC power, and in the case where a signal having a frequency substantially larger than the frequency of the AC power is applied to the output of the position detection unit, to the output of the position estimation unit, or to the output of the current detection unit, the control unit keeps the frequency of the AC power substantially the same.

A second aspect of the present invention that is achieved with the above-described problem in mind is a compressor that includes: an armature having magnetic poles and winding wires; a mover having a permanent magnet; and a power conversion unit that outputs AC power to the winding wires, in which the mover and the armature are relatively movable, the mover or the armature is connected to an elastic body and a piston, and the piston compresses a fluid as a load. The compressor further includes: a position detection unit that detects and outputs the position of the mover or the position of the piston with respect to the armature, a position estimation unit that estimates and outputs the position of the mover or the position of the piston with respect to the armature; and a control unit that controls the output of the power conversion unit on the basis of the output of the position detection unit, or the output of the position estimation unit, in which the frequency of the AC power is increased or decreased in the same correlation with the increase or decrease of the load.

DESCRIPTION OF EMBODIMENTS

Hereinafter, examples according to the present invention will be explained in detail with reference to the accompanying drawings. In the explanations of the examples, the same components are given the same reference signs, and duplicated explanations about them will be omitted.

It is not necessarily required that various kinds of components according to the present invention are provided independently of one another, and it is allowable that plural components are formed as one member, one component is composed of plural members, a certain component is part of another component, part of a certain component and part of another component are duplicated, and so on.

Embodiment 1

In this embodiment, although terms "the forth direction" and "the back direction" that are orthogonal to each other, "the right direction" and "the left direction" that are orthogonal to each other, "the up direction" and "the down direction" that are orthogonal to each other are used for convenience of explanation, the direction of gravitational force is not always equal to the down direction, and it can be set parallel with the forth direction, the back direction, the right direction, the left direction, the up direction, the down direction, or other directions.

<Linear Motor Drive Device 101>

Figure 1:
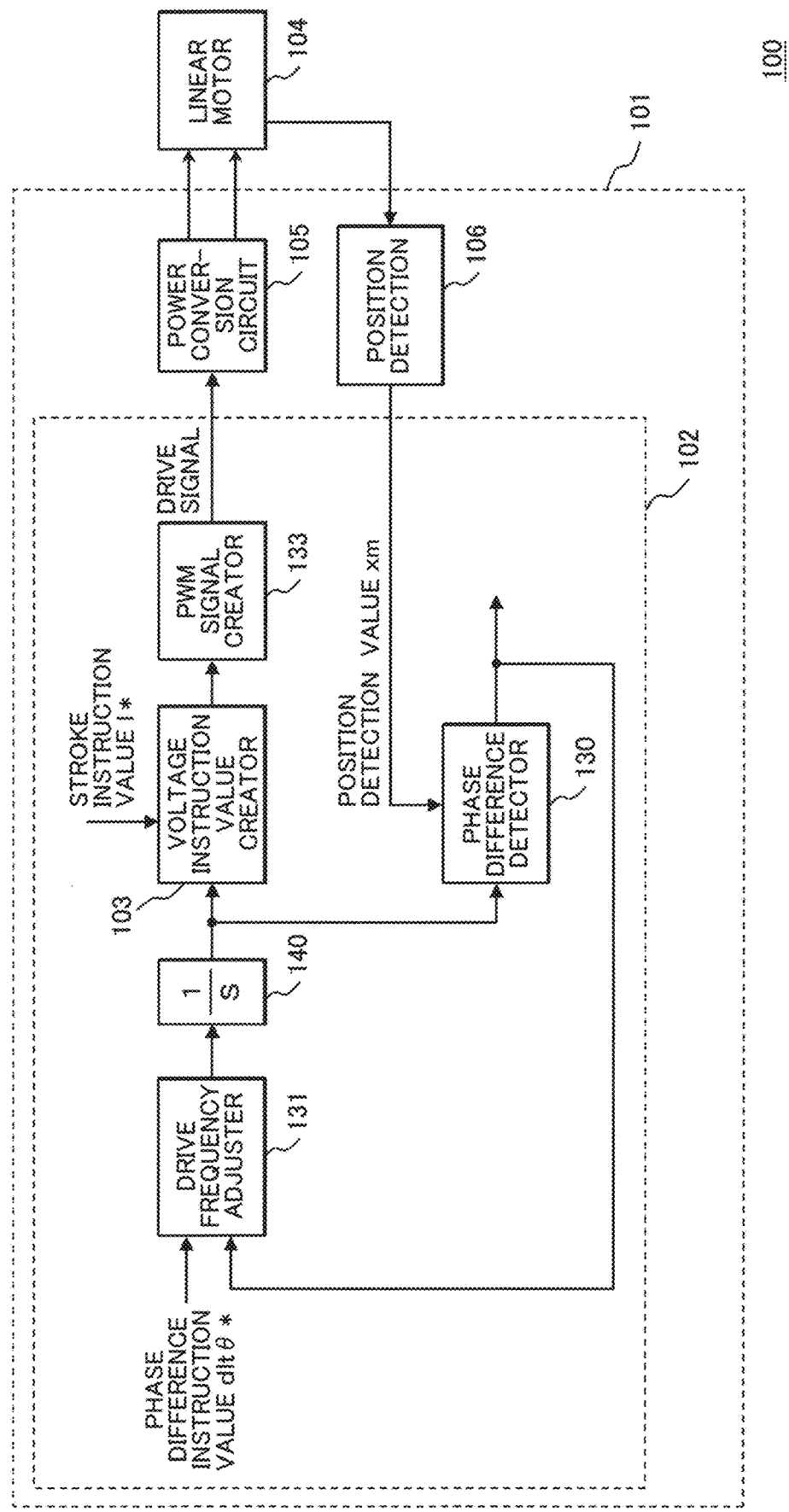
FIG. 1 is a diagram showing a configuration example of a linear motor system.

FIG. 1 is a schematic diagram of a linear motor system 100. The linear motor system 100 includes a linear motor drive device 101 and a linear motor 104. As described later, the linear motor 104 includes an armature 9 and a mover 6 that are relatively movable.

The linear motor drive device 101 includes position detection means 106, a control unit 102, and a power conversion circuit 105.

The position detection means 106 detects the relative position of the mover 6 (the mover position) to the armature 9.

The control unit 102 outputs an output voltage instruction value to the power conversion circuit 105, or a drive signal (a pulse signal) for driving the power conversion circuit 105 according to the detection results of the position detection means 106.

Although the detail of the power conversion circuit 105 will be described later, the power conversion circuit 105 is an example of a power conversion unit that converts and outputs the voltage of a DC voltage source 120. Here, a DC current source can be used instead of the DC voltage source 120.

<Linear Motor 104>

Figure 2:
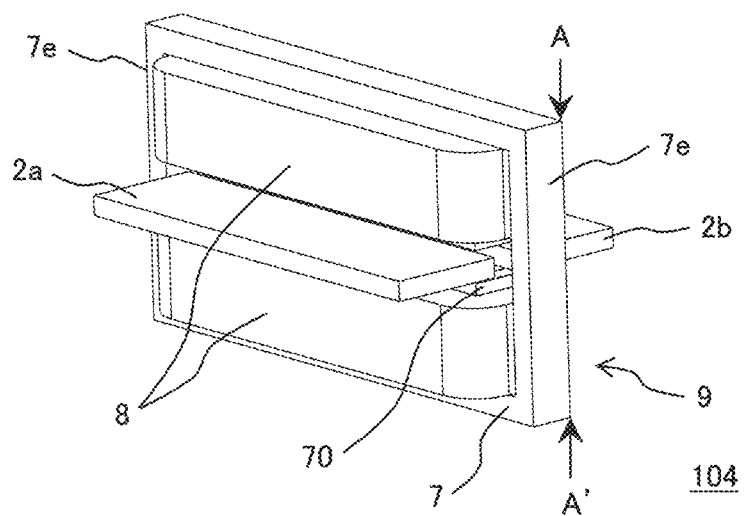
FIG. 2 is a perspective view of a constitutional example of an armature.
Figure 2:
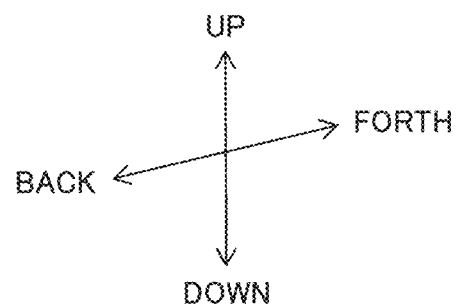

FIG. 2 is a perspective view of the linear motor 104. The armature 9 includes two magnetic poles 7 facing each other in both up and down directions with an air gap therebetween and winding wires 8 winding around the magnetic poles 7. The mover 6 is disposed in this air gap. The magnetic poles 7 have magnetic pole teeth 70 as their edge surfaces facing the mover 6.

The armature 9 can give force in the forth or back direction (referred to as thrust hereinafter) to the mover 6. For example, as described later, the thrust can be controlled so that the mover 6 can move in the back-and forth direction.

The mover 6 includes two plate permanent magnets 2 (2a and 2b) that are magnetized in up-and-down direction and arranged in the back direction and the forth direction respectively. In FIG. 2, the permanent magnets 2a and 2b are shown, but the mover 6 is not shown. As the mover 6, a plate shaped mover obtained by fixing plate permanent magnets 2 can be adopted, for example. The mover 6 is relatively movable in the back-and-forth direction to the armature 9. Hereinafter, the relative velocity of the mover 6 to the armature is referred to as the velocity of the mover 6.

The control unit 102 can output the drive signal, for example, so that the mover 6 can move in the back-and-forth direction within the range where the permanent magnets 2a and 2b face the armature 9.

Figure 3:
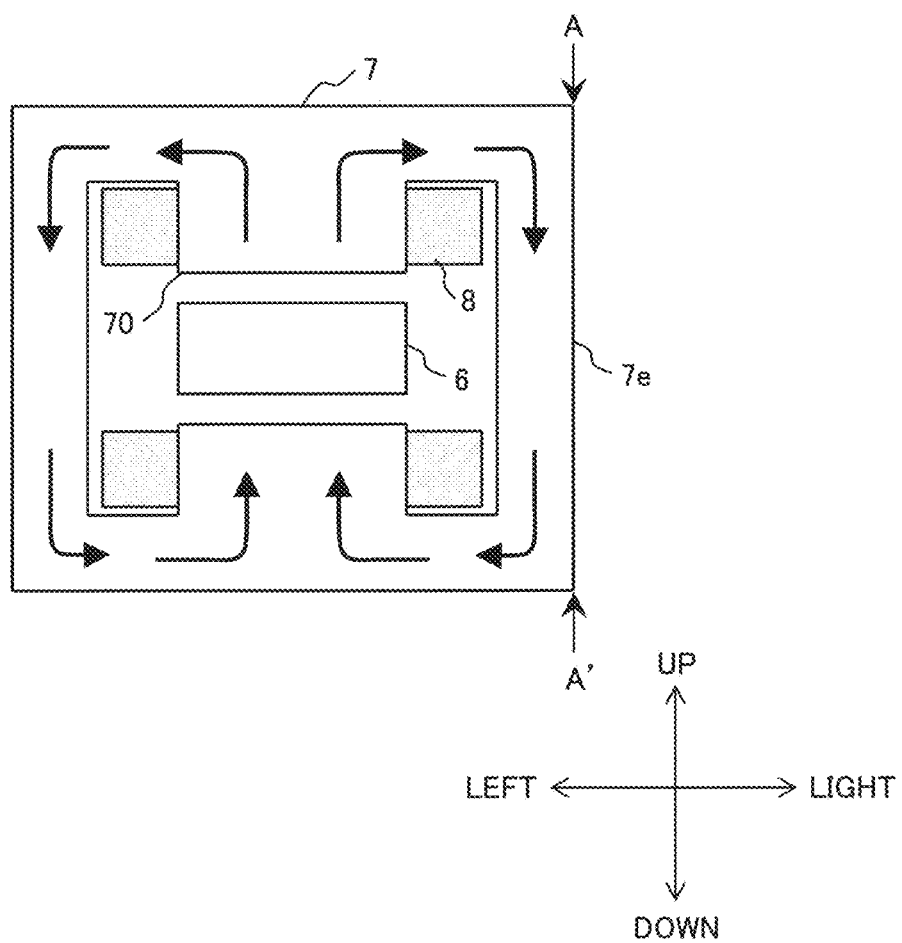
FIG. 3 is a schematic diagram showing the cross-sectional view of a magnetic pole and the flows of magnetic fluxes.

FIG. 3 is a cross-sectional view taken along the line A-A' of FIG. 2. The arrow lines shown in FIG. 3 show examples of magnetic flux lines that are generated when a current is flown through the two winding wires 8. Because the directions of the flows of the magnetic fluxes can be reversed by the current flowing through the winding wires 8, the directions of the flows of the magnetic fluxes are not necessarily the directions shown in FIG. 3. These magnetic flux lines magnetize the magnetic pole teeth 70.

[Thrust Given to Mover 6]

Figure 4A:
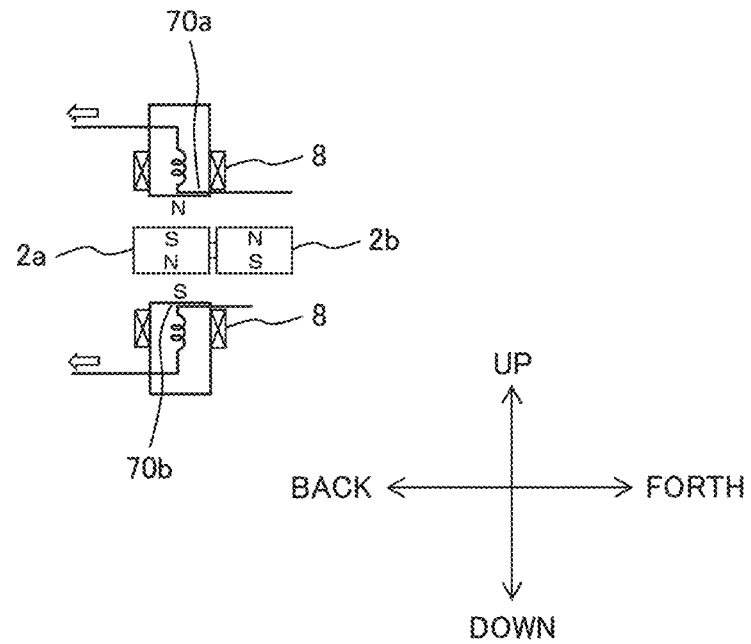
FIGS. 4A and B show explanatory diagrams of polarities generated at magnetic pole teeth.
Figure 4B:
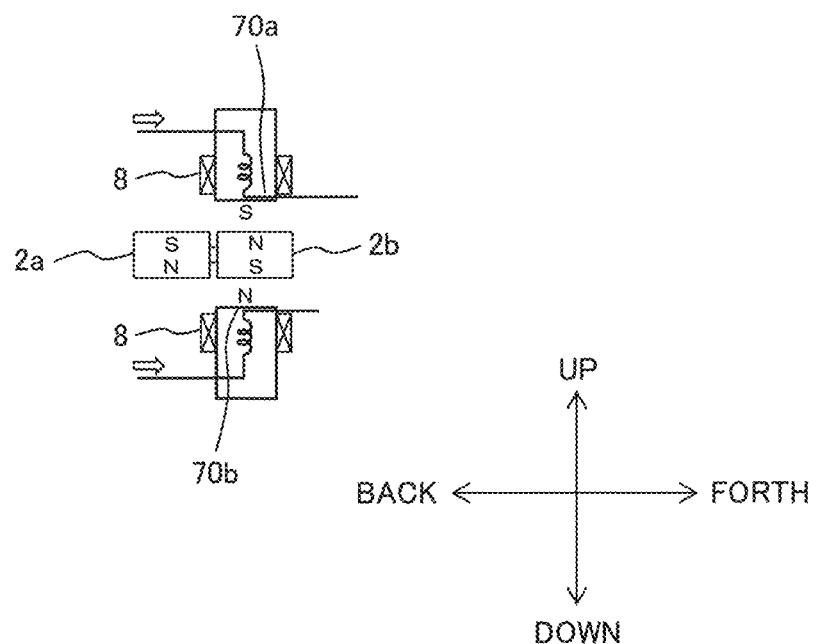

FIG. 4 is a diagram explaining thrust that is exerted on the mover 6 due to the magnetization of the magnetic pole teeth 70. The polarities of the magnetic pole teeth 70 generated by the current flowing through the winding wires 8 are represented by signs "N" and signs "S" marked down in the vicinities of the magnetic pole teeth 70. FIG. 4(a) shows an example in which force is exerted on the mover 6 in the forth direction because the upper magnetic pole tooth 70a is magnetized to become "S" and the lower magnetic pole tooth 70b is magnetized to become "N". FIG. 4(b) shows an example in which force is exerted on the mover 6 in the back direction because the upper magnetic pole tooth 70a is magnetized to become "N" and the lower magnetic pole tooth 70b is magnetized to become "S".

As described above, magnetic circuits including the two magnetic poles 7 are provided with magnetic fluxes by applying a voltage or a current to the winding wires 8, and the two magnetic pole 70 teeth (a pair of magnetic pole teeth) facing each other can be magnetized. By applying an AC voltage or an AC current such as a sine wave voltage or current or a rectangular wave (a square wave) voltage or current as a voltage or a current, thrust that makes the mover 6 move in the back-and-forth direction can be given to the mover 6. In such a way, the motion of the mover 6 can be controlled.

In addition, the thrust given to the mover 6 can be changed by changing the amplitude of the applied AC voltage or the amplitude of the AC current. Furthermore, the displacement of the mover 6 can be changed in a desired manner by appropriately changing the thrust given to the mover 6 using a well-known method. Here, in the case where the mover 6 performs back-and-forth movements (for example, these movements are generated when the magnetization of the magnetic pole teeth 70 shown in FIG. 4(*a*) and FIG. 4(*b*) is sequentially repeated), the change amount of the displacement of the mover 6 that changes in an AC waveform manner is referred to as a stroke.

Because the magnetic pole teeth 70 are magnetic materials, the magnetic pole teeth have magnetic sucking forces that draw the permanent magnets 2. In this example, because the two magnetic pole teeth 70 are disposed so as to face each other with the mover 6 therebetween, the resultant force of the magnetic sucking forces exerted on the mover 6 can be reduced.

[Mechanism Outside of Mover 6]

Figure 5:
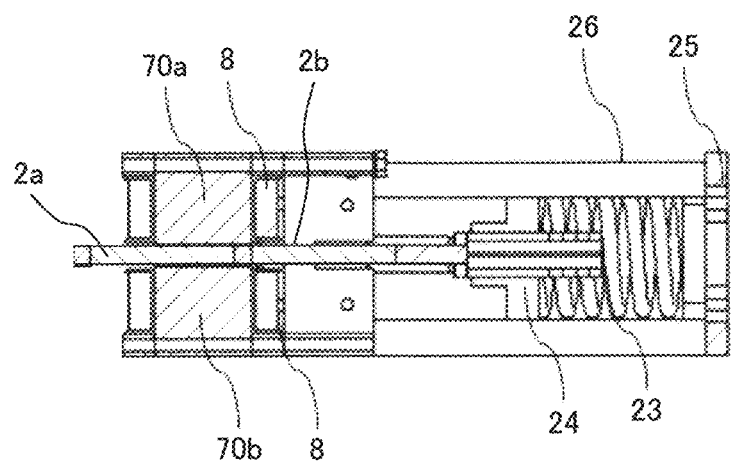
FIG. 5 is the explanatory diagram of an external mechanism connected to a mover.

FIG. 5 is an explanation diagram of a mechanism in which an external mechanism including a resonance spring 23, which is a kind of coil spring, is connected to the mover 6, and the mover 6 is pulled back due to the spring force of the resonance spring 23. The one end of the resonance spring 23 is connected to the mover 6 via an intermediate section 24 therebetween, and the other end is fixed to a base section 25. In addition, a side section 26 is installed in such a way that the side section 26 extends approximately parallel to the extending direction of the resonance spring 23 in order to guide or support the resonance spring 23.

In the case of making the linear motor 104 move in the back-and-forth direction, acceleration and deceleration are alternately repeated every time the movement direction of the mover 6 is changed. In the case of the deceleration, although the velocity energy of the mover 6 is converted into electric energy (a regenerative operation), loss is generated due to the resistances of wires connected to the linear motor 104. On the other hand, as shown in FIG. 5, if the resonance spring 23 (the assistant spring) is attached to the mover 6, and the mover 6 is moved back-and-forth at a mechanical resonance frequency determined by the mass and spring constant of the mover 6, the velocity energy of the mover 6 can be effectively utilized, so that a highly efficient linear motor drive system can be configured. A well-known elastic body can be used instead of the resonance spring 23. Although, with such a configuration of the linear motor drive system, the drive system is configured as a mover 6 (a field magneton 6) mobile type drive system in which the mover 6 (the field magneton 6) moves with respect to the ground, the drive system can be configured as an armature mobile type drive system in which the armature 9 moves with respect to the ground using the armature 9 connected to the elastic body instead of the mover 6.

Figure 6:
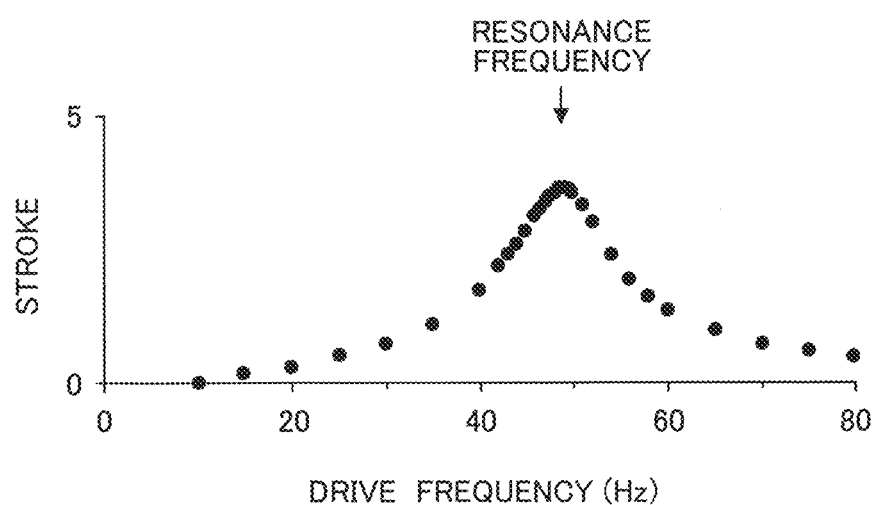
FIG. 6 is an explanatory diagram of a relation between a drive frequency and a stroke.

FIG. 6 is a diagram showing a relation between the frequency of the AC voltage (in the vertical axis) and the stroke of the mover 6 (in the horizontal axis). The amplitude of the AC voltage is constant at each frequency. As is clear from FIG. 6, the stroke of the mover 6 drastically becomes large in the vicinity of the resonance frequency, and it becomes smaller as the frequency of the AC voltage gets farther away from the resonance frequency. Although the resonance frequency is given by the square root of the value obtained by dividing the spring constant k of the resonance spring 23 by the mass m of the mover 6, this value may be an approximate value depending on a type of the linear motor 104.

In such a way, by applying an AC voltage having the resonance frequency or a frequency in the vicinity of the resonance frequency, it becomes possible to vibrate the mover 6 with a large stroke (with large energy). In other words, it is important to detect or estimate the resonance frequency of the mover 6. It is preferable to this detection or estimation is accurately executed in order to accurately control the drive frequency in accordance with the variations of the spring constant k and the mass m of the resonance spring.

[Phase Relation at Driving Time]

Figure 7A:
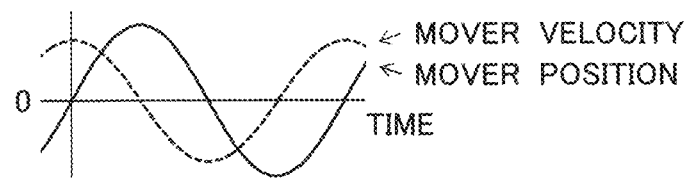
FIGS. 7A and 7B show explanatory diagrams of a phase relation between an applied voltage and a current.
Figure 7B:
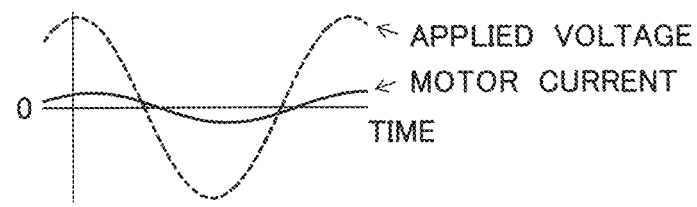
Figure 8:
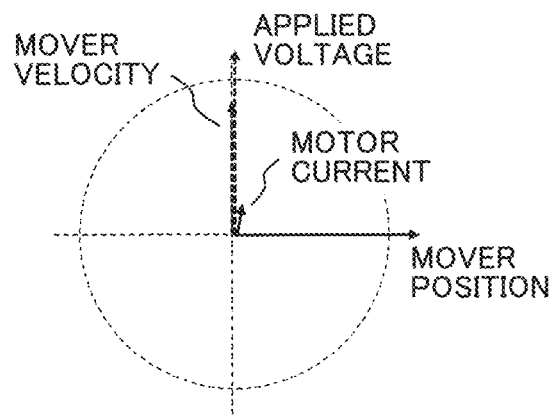
FIG. 8 is a vector diagram showing the applied voltage and the current.

FIG. 7(*a*) is a diagram showing a relation between the position and velocity of the mover 6 and FIG. 7(*b*) is a diagram showing a relation between the applied voltage waveform and the current flowing through the linear motor 104 along with the passage of time when the linear motor 104 is driven. FIG. 8 is a diagram showing the AC waveforms shown in FIG. 7 as vectors. As is clear from FIG. 8, the phases of the velocity of the mover 6, the applied voltage, and the motor current are approximately identical. In the case where the resonance spring 23 is added to the mover 6, and the mover 6 is moved back-and-forth at a mechanical resonance frequency determined by the mass and spring constant of the mover 6, it is known that the phase of the position of the mover 6 is different from the phase of the applied voltage V to the winding wires 8, the phase of the motor current Im, and the phase of the velocity of the mover 6 by 90 degrees respectively. In other words, if any of the above-mentioned relations is established, it can be estimated that the mover 6 is driven at the resonance frequency.

For example, in the case where the mass of the mover 6 departs from the expected value due to production variations (anomalies), or in the case where the mass connected to the resonance spring 23 varies due to a load element added to the mover 6, the resonance frequency changes. In order to obtain the maximum stroke even in such a case, it is preferable to highly accurately detect or estimate the resonance frequency that changes in accordance with some conditions. Hereinafter, the detection method and the estimation method of the resonance frequency will be explained.

<Control Unit 102>

The control unit 102 and the like will be explained with reference to FIG. 1 and the like. A position detection value xm, which is detected by the position detection means 106, is input into the control unit 102. The position detection value xm includes information about the phase of the mover 6. The input position detection value xm along with a phase instruction value θ* generated by the control unit 102 is input into a phase difference detector 130, and a phase difference estimation value dltθ^ is output. A residual error between the phase difference instruction value dltθ*, which is a target value, and the phase difference estimation value dltθ^ is input into a drive frequency adjuster 131. The drive frequency adjuster 131 outputs a frequency instruction value ω*. The applied voltage V based on the frequency instruction value ω* is output to the linear motor 104. As the position detection means 106, a calculation unit that estimates the relative position using a position sensor that detects the relative position of the mover 6 to the armature 9, the applied voltage V, and the motor current Im, or the like can be adopted. Hereinafter, the control unit 102 and the like will be explained in detail.

The control unit 102 includes: the phase difference detector 130; the drive frequency adjuster 131 that adjusts a drive frequency instruction value $\omega^*$ on the basis of the output $dlt\hat{\theta}$ of the phase difference detector 130 and the phase difference instruction value $dlt\theta^*$ so that the phase difference estimation value $dlt\hat{\theta}$ follows the phase difference instruction value $dlt\theta^*$; an integrator 140 that integrates the drive frequency instruction value $\omega^*$ and creates the phase instruction value $\theta^*$; a voltage instruction value creator 103 that outputs a voltage instruction value $V^*$ on the basis of the phase instruction value $\theta^*$ and the stroke instruction value $I^*$ of the mover 6; and a PWM signal creator 133 that outputs a drive signal for driving the power conversion circuit 105, which outputs a voltage, by comparing the voltage instruction value $V^*$ and a triangular wave carrier signal. Here, the power conversion circuit 105 can be a current output-type power conversion circuit. In this case, a current instruction value creator has only to be installed instead of the voltage instruction value creator 103.

<Reference Phase Creator>

In the case where a position sensor is used for estimating the relative position xm of the mover 6 to the armature 9, the output of the position sensor can be used, and therefore a well-known position sensor has only to be adopted appropriately. In this example, although means for estimating the resonance frequency using a difference between the phase of the position of the mover 6 and the phase of the applied voltage V to the winding wires 8 or the phase of the motor current Im will be explained, let's first explain a reference phase (the phase of the mover 6) that acts as a reference for other phases.

The reference phase (the phase instruction value $\theta^*$) of this example is obtained by integrating the drive frequency instruction value $\omega^*$, which is the output of the drive frequency adjuster 131 shown in FIG. 1, using the integrator 140 that acts as a reference phase creator. In other words, the reference phase is the phase $\theta^*$ of a wave having the drive frequency instruction value $\omega^*$ corresponding to the target frequency of the applied voltage $V(\theta^*)$ at each time. As described above, although the integral of the drive frequency instruction value $\omega^*$ of the drive frequency adjuster 131 is used as the reference phase $\theta^*$, it is also conceivable that the integrated value is fixed to, for example, the mechanical resonance frequency of a vibration body including the mover 6.

In the case where the reference phase $\theta^*$ is used as the phase of the applied voltage V, the reference phase $\theta^*$ can also be used in the detection or estimation of the position of the mover 6. The reference phase $\theta^*$ can be set to a saw-tooth wave the value range of which is, for example, $[-\eta, \eta]$, $[0, 2\eta]$, or wider with time, or can be set to a linearly increasing wave with time during a time period where the drive frequency instruction value $\omega^*$ is constant. As described later, if the drive frequency instruction value $\omega^*$ changes, the shape of the saw-tooth wave or the shape of the linearly increasing wave vary (the slopes of these waves change).

It goes without saying that the position detection value xm detected by the position detection means 106 can be used for obtaining the reference phase $\theta^*$. In the case of using the position detection value xm, the total transfer length of the displacement of one period of the back-and-forth movement of the mover 6 is set to 360°, for example, and the reference phase $\theta^*$ can be calculated using the ratio of the position (=displacement) of the mover 6 from the reference position (for example, the intermediate point of the back-and-forth movement, the maximum position or the minimum position of the back-and-forth movement) to a length corresponding to the total transfer length.

<Phase Difference Detector 130>

In the case where the mover 6 moves in the back-and-forth direction, the position xm of the mover 6 is represented by a periodic function. Because a periodic function can be represented by a Fourier series, the position xm of the mover 6 can be given by the following expression using a Fourier transform expression.

[Expression 1]

$$x_m = x_0 + \sum_{n=1}^{\infty} \{a_n \cdot \cos(n\omega_0 t) + b_n \cdot \sin(n\omega_0 t)\} \quad (1)$$

Here, x0 is a DC offset value, and an and bn are nth-order Fourier coefficients and an and bn are given by the following expressions.

[Expression 2]

$$a_n = \frac{2}{T_0} \cdot \int_{-\frac{\pi}{2}}^{\frac{\pi}{2}} x_m \cdot \cos(n\omega_0 t) dt \quad (2)$$

[Expression 3]

$$b_n = \frac{2}{T_0} \cdot \int_{-\frac{\pi}{2}}^{\frac{\pi}{2}} x_m \cdot \sin(n\omega_0 t) dt \quad (3)$$

Here, T0 is the period of the fundamental wave (the period during which the mover 6 performs the back-and-forth movement once); in other words, T0 is the reciprocal of a primary frequency (a drive frequency).

In the case of controlling the mover 6 to be driven at the resonance frequency, the higher order components are not important; in other words, only the primary component, that is, only the drive frequency component had to be noticed. In particular, the phase $\theta$ of the primary frequency component (the drive frequency component) of the position xm of the mover 6 is important. The phase of the position xm of the mover 6 relative to the applied voltage V having a sine wave pattern can be given by the following expression using arctangent of the first order Fourier coefficients. As described above, it is preferable that the target value $dlt\theta^*$ of the phase difference $dlt\theta$ should be set and controlled so that a difference between the phase of the applied voltage V (the reference phase $\theta^*$) and the phase of the position xm of the mover becomes 90°.

[Expression 4]

$$\hat{\theta}_{pos} = \tan^{-1}\left(\frac{b_1}{a_1}\right) = \tan^{-1}\left(\frac{\int_{-2\pi}^{0} x_m \cdot \sin\omega_0 t \, dt}{\int_{-2\pi}^{0} x_m \cdot \cos\omega_0 t \, dt}\right) \quad (4)$$

In Expression (4), the integration range runs from $-2\pi$ to 0, and this is because only information in the past can be obtained in the case where the phase difference detector 130 is materialized by semiconductor integrated circuits and the like such as microcomputers and DSPs.

Figure 9:
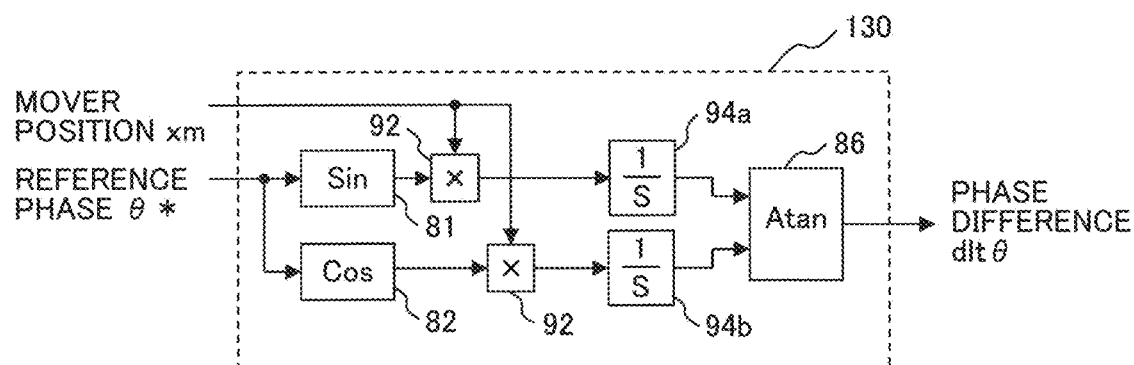
FIG. 9 is an explanatory diagram showing a configuration example of a phase difference detector.

FIG. 9 is an explanatory diagram showing a block diagram for bringing Expression (4) into shape. The phase instruction value $\theta^*$ is input into a sine calculator 81 (which outputs the sine value of an input value), and a cosine calculator 82 (which outputs the cosine value of an input value) respectively, so that the sine value and the cosine value for the phase instruction value $\theta^*$ are obtained. The sine value multiplied by the position xm of the mover 6 and the cosine value multiplied by the position xm of the mover 6 are output from multipliers 92 respectively. The outputs are respectively integrated by integrators 94$a$ and 94$b$, so that the first order Fourier coefficient of sine components and the first order Fourier coefficient of cosine components are obtained. In other words, frequency components having frequencies higher than the drive frequency $\omega$ in the Fourier expansion can be eliminated, so that the robustness against noises having higher order frequencies can be obtained.

Figure 10:
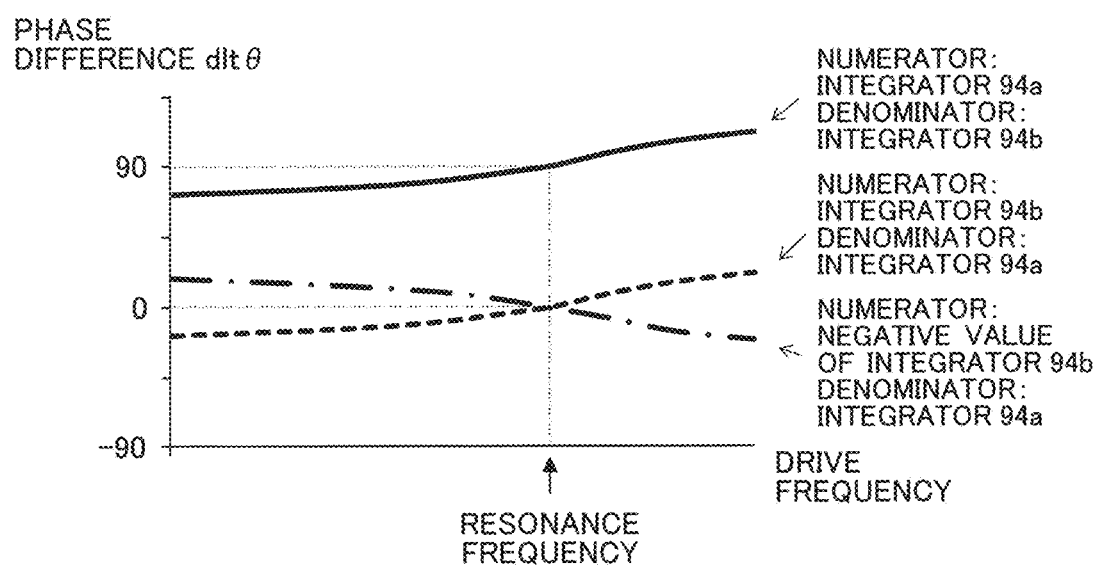
FIG. 10 is an explanatory diagram showing a relation between the drive frequencies and the outputs of a phase difference detector.

The outputs of the integrators 94$a$ and 94$b$ are input into an arctangent calculator 86. The arctangent calculator 86 outputs an arctangent value on the basis of the input sine component and cosine component. Although the arctangent calculator 86 of this example outputs the arctangent value of a phase the numerator of which is the output of the integrator 94$a$ and the denominator of which is the output of the integrator 94$b$, the arctangent value of a phase the numerator and denominator of which are exchanged with each other can also be output. FIG. 10 is a diagram showing a relationship between the frequency of the AC voltage (the horizontal axis) and the output value of the arctangent calculator 86 (the phase difference dlt$\theta$) (the vertical axis). As is clear from FIG. 10, even if the values of the integrators 94$a$ and 94$b$ are the same, the output value of the arctangent calculator 86 (the phase difference dlt$\theta$) changes depending on a combination of the numerator and the denominator input into the arctangent calculator 86. In the case of this example where a value obtained by multiplying the sine value by the position xm of the mover 6 is set to the numerator and a value obtained by multiplying the cosine value by the position xm of the mover 6 is set to the denominator, if the drive frequency is the resonance frequency, 90° is output from the arctangent calculator 86. The value output from the arctangent calculator 86 is larger than 90° if the driving frequency is higher than the resonance frequency, and smaller than 90° if the driving frequency is lower than the resonance frequency. Herewith, the phase difference dlt$\theta$ of the primary frequency component of the input AC signal (the position xm of the mover 6 in this embodiment) input into the phase difference detector 130 relative to the reference phase $\theta^*$ can be obtained, which makes it possible to estimate the resonance frequency. It is preferable to control the phase difference dlt$\theta$ so that the phase difference dlt$\theta$ when the reference phase $\theta^*$ becomes equal to the fundamental frequency $\theta$ is set to the target value dlt$\theta^*$. In other words, it is desirable that the target value dlt$\theta^*$ should be appropriately selected depending on a combination of the numerator and the denominator input into the arctangent calculator 86.

Because, when inputs (the reference phase $\theta^*$ and the position xm of the mover) change, the convergence times of the integrators 94$a$ and 94$b$ are comparatively large, if, for example, an offset signal is added to the output of the position detector 106 as a superimposed signal, the frequency of the AC power is apt to fluctuate for a comparatively long time until the outputs of the integrators 94$a$ and 94$b$ converge. A similar thing holds true in the case where a signal having a frequency lower than a frequency that is supposed to be the drive frequency instruction value $\omega^*$ is added as a superimposed signal as well.

Figure 11:
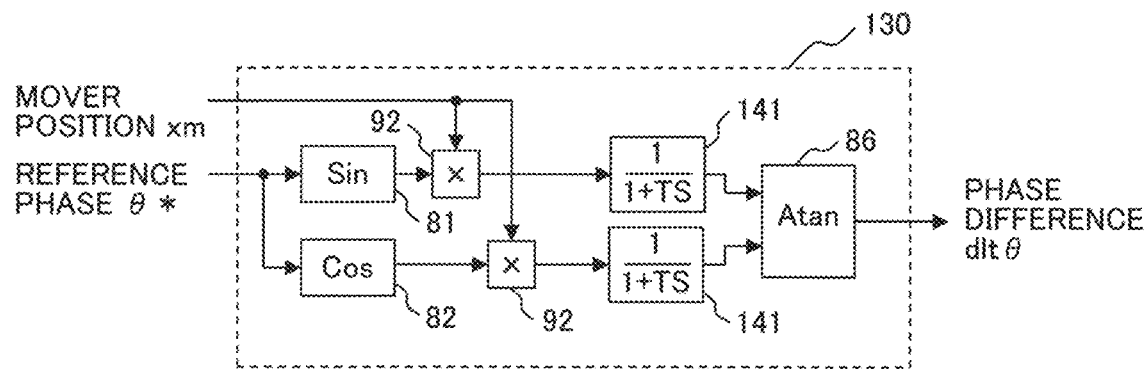
FIG. 11 is an explanatory diagram showing a second configuration example of a phase difference detector.

Therefore, it is conceivable that imperfect integrators are used instead of the integrators 94$a$ and 94$b$. An imperfect integrator is a kind of a low-pass filter, and the configuration of the imperfect integrator is similar to that of a primary delay filter. FIG. 11 shows an example of a phase difference detector in which primary delay filters 141 is used instead of the integrators 94$a$ and 94$b$. Using the primary delay filters 141 and setting appropriate time constants T makes it possible to shorten the convergence time of the phase difference detection. In other words, in the case where an offset signal is added to the input or output of the position detection means 106 as a superimposed signal used in the after-mentioned verification method, the frequency of the AC power can be easily kept approximately constant. In other words, robustness can be secured in a system in which disturbances and the like easily are superimposed on the position xm of the mover.

Alternatively, it is conceivable that high-pass filters (not shown) are installed on paths that are located before the integrators 94$a$ and 94$b$ (or the imperfect integrators 141) and through which the signals multiplied by the position xm of the mover flow. The cutoff frequencies of the high-pass filters can be set smaller than the lower limit value of the drive frequency co; for example, equal to or smaller than 10 Hz or 5 Hz in the case of a linear motor system such as this embodiment.

In this way, in the case where the phase difference detector 130 calculates the phase $\theta$ of the position xm of the mover corresponding to the AC voltage instruction value $V^*$ using the arctangent of the ratio of the first order Fourier coefficients of the drive frequency components, the phase difference detector 130 has a large sensitivity only to the primary frequency component of an input AC signal input into itself. In other words, for example, even if a DC offset or higher order noises are superimposed on the position xm of the mover 6, the phase difference dlt$\theta$ of the primary frequency component of the input AC signal into the phase difference detector 130 relative to the reference phase $\theta^*$ can be calculated more accurately. In addition, if high-pass filters are installed as mentioned above, robustness can be secured against frequencies lower than the drive frequency co as well.

Therefore, in the case where a system in which noises are easily superimposed, such as a system in which an inductance is largely dependent on the position of the mover or a system located near to another instrument, is adopted as a method for detecting the position of the mover 6, especially effective control can be realized. In this way, the resonance frequency can be detected or estimated with high accuracy, and highly efficient linear motor driving can be realized.

<Drive Frequency Adjuster 131>

Figure 12:
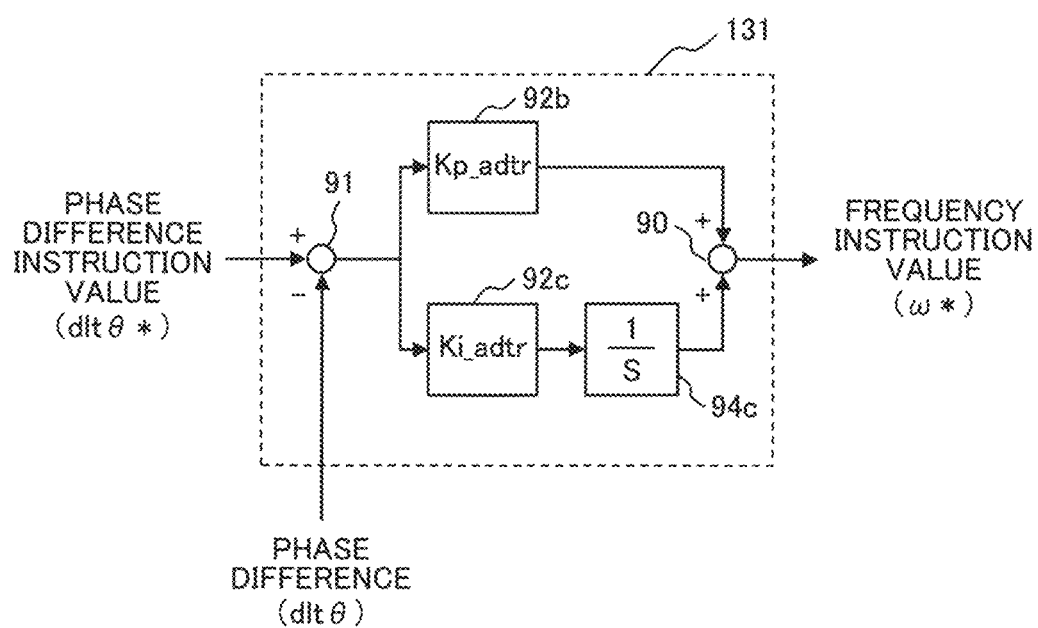
FIG. 12 is an explanatory diagram showing a configuration example of a drive frequency adjuster 131.

FIG. 12 is an explanatory diagram showing the configuration of the drive frequency adjuster 131. The drive frequency adjuster 131 calculates a difference between the phase difference instruction value dlt$\theta^*$ (for example, 90°) and the phase difference dlt$\theta$ obtained in the phase difference detector 130 at a subtractor 91, performs proportional control over the above difference by multiplying the above difference by a proportional gain Kp_adtr at a multiplier 92$b$, performs integral control over the above difference by multiplying the above difference by an integral gain Ki_adtr at a multiplier 92$c$ and by integrating the resultant value obtained by the above multiplication at an integrator 94$c$, and adds a calculation result obtained by the proportional control and a calculation result obtained by the integral control using an adder 90, and then the drive frequency adjuster 131 outputs the drive frequency instruction value ω*.

Here, it is conceivable that the phase difference instruction value dltθ* is obtained using higher-level control means (not shown in this example), and it is also conceivable that the difference instruction value dltθ* is set to, for example, 90° in advance as shown in this embodiment. Furthermore, although the drive frequency adjuster 131 according to this embodiment is fabricated in a proportional-and-integral control configuration, other control configurations such as a proportional control configuration and an integral control configuration can also be applied to the drive frequency adjuster 131.

[Realization of High-Efficiency Drive]

The operations of the phase difference detector 130 and the drive frequency adjuster 131 in the case where the linear motor 104 is driven at the mechanical resonance frequency determined by the mass and spring constant of the mover 6 will be explained.

For example, if the mass of the mover 6 is larger than the designed value of the mass, the actual resonance frequency becomes lower than the designed value of the resonance frequency. In other words, if the initial value of the drive frequency is determined using the designed value of the mass of the mover 6 (if the initial value of the drive frequency instruction value ω* is determined using the designed value of the mass), the linear motor 104 is driven at a frequency higher than the actual resonance frequency. In this case, the phase difference dltθ calculated by the phase difference detector 130 becomes larger than the phase difference instruction value dltθ*. Therefore, the drive frequency adjuster 131 performs control to reduce the drive frequency instruction value ω*, so that the drive frequency instruction value ω* coincides with an actual resonance frequency. As a result, the velocity energy of the mover 6 can be effectively utilized, and the linear motor 104 can efficiently be driven.

<Voltage Instruction Value Creator 103>

Hereinafter, a configuration, in which the linear motor 104 is driven by a voltage V that is created on the basis of a voltage instruction value Vm* and applied to the linear motor 104, will be explained.

Figure 13:
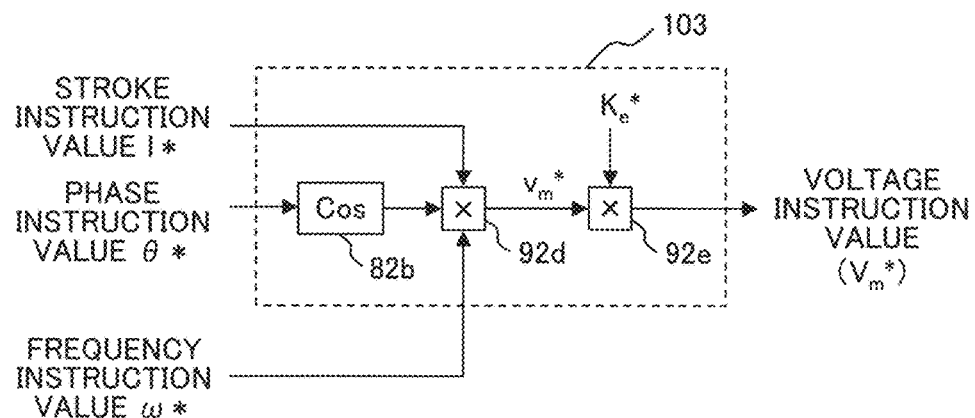
FIG. 13 is an explanatory diagram showing a configuration example of a voltage instruction value creator 103.

FIG. 13 is an explanatory diagram showing the configuration of a voltage instruction value creator 103. The voltage instruction value creator 103 brings in the phase instruction value θ* and the stroke instruction value I*, and outputs the single-phase AC voltage instruction value Vm*. The details will be given below.

In this embodiment, an assumption that the value obtained by multiplying the stroke instruction value I* by the sine of the reference phase θ* (sin θ*) is set to the position instruction value xm* of the mover 6 is adopted. First, the phase instruction value θ* is input into the cosine calculator 82b (which outputs the cosine of the input value), and the cosine of the phase instruction value θ* (cos θ*) is obtained. This cosine value, the stroke instruction value I*, and the frequency instruction value ω* are multiplied at a multiplier 92d. With such a configuration, it is possible to obtain the velocity instruction value vm* of the mover 6 without executing differential calculation. Generally speaking, it is possible to make a sine of one of the position instruction value xm* and the velocity instruction value vm* and a cosine of the other.

In addition, the single-phase AC voltage instruction value Vm* is obtained by multiplying the velocity instruction value vm* of the mover 6 by an induced voltage constant Ke* at a multiplier 92e.

Furthermore, a well-known drive voltage instruction method for driving a synchronous motor can also be applied to the voltage instruction value creator 103 instead of the above method.

<PMW Signal Creator 133>

In the PWM signal creator 133, a drive signal corresponding to the voltage instruction value Vm* is generated using a well-known pulse width modulation in which a triangular wave carrier signal and the voltage instruction value Vm* are compared with each other.

<Power Conversion Circuit 105>

Figure 14:
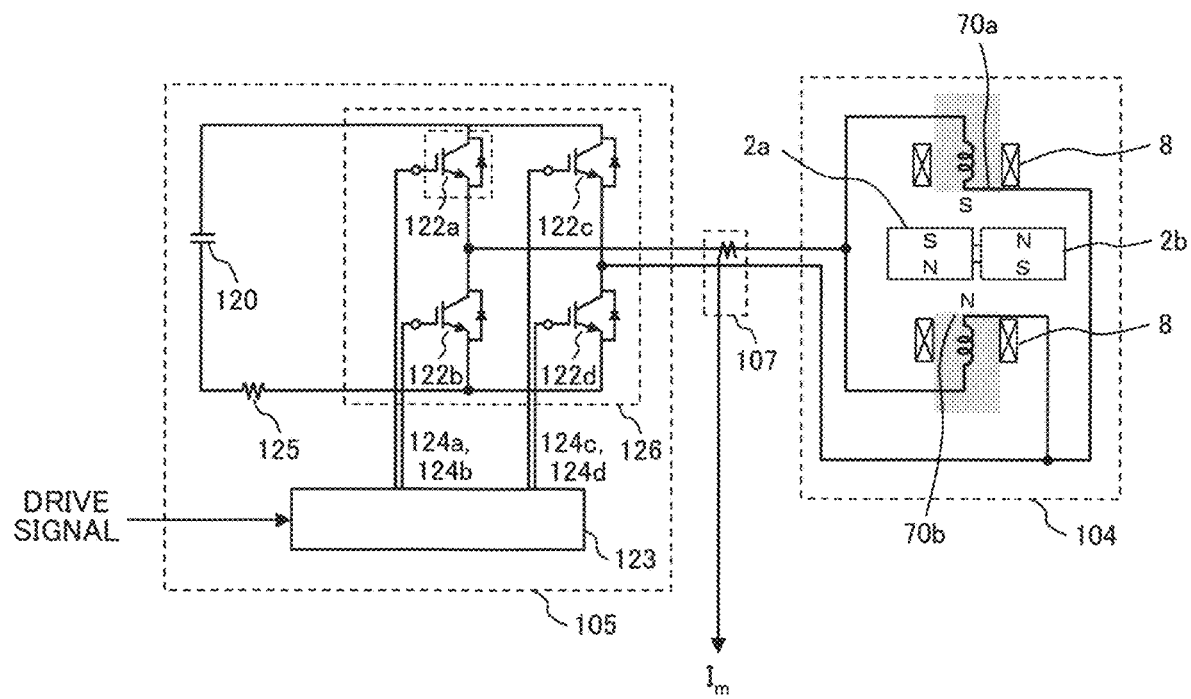
FIG. 14 is a diagram showing a configuration example of a power conversion circuit.

FIG. 14 is an explanatory diagram showing the configuration of the power conversion circuit 105. The power conversion circuit 105 includes the DC voltage source 120, a shunt resistor 125, and a full bridge circuit 126. The full bridge circuit 126 outputs a voltage to the linear motor 104 by switching the DC voltage source 120 in accordance with a drive signal input from the control unit 102. The full bridge circuit 126 includes four switching elements 122, and the four switching elements 122 form a first upper and a first lower arms (referred to as a U-phase hereinafter) having switching elements 122a and 122b respectively and a second upper and a second lower arms (referred to as a V-phase hereinafter) having switching elements 122c and 122d respectively. The switching elements 122 can execute switching operations in accordance with pulse-shaped gate signals (124a to 124d) that a gate driver circuit 123 outputs on the basis of a voltage instruction value generated by the control unit 102 and a drive signal generated by pulse width modulation.

By controlling the conduction states (ON/OFF) of the switching elements 122, the DC voltage of the DC voltage source 120 the voltage corresponding to an AC voltage can be output into winding wires 8. Here, a DC current source can be used instead of the DC voltage source 120. As the switching elements 122, semiconductor switching elements such as IGBTs and MOS-FETs can be adopted, for example.

[Wire Connection to Linear Motor 104]

In the power conversion circuit 105, a point between the switching element 122a of the first upper arm and the switching element 122b of the first lower arm is connected to the linear motor 104 and a point between the switching element 122c of the second upper arm and the switching element 122d of the second lower arm is also connected to the linear motor 104. In FIG. 14, although the winding wires 8 of the upper and lower armatures 9 are connected in parallel with each other, it is also possible to connect the winding wires 8 in series.

[Current Detection Means 107]

Current detection means 107 such as CTs (current transformers) can be installed on the U-phase lower arm and V-phase lower arm. Using these CTs, a motor current Im flowing through the winding wires of the linear motor 104 can be detected.

As the current detection means 107, a phase shunt current scheme, in which shunt resistors are installed to the lower arms of the power conversion circuit 105 instead of the CTs, and a current flowing through the linear motor 104 is detected from currents flowing through the shunt resisters, can be adopted. It is also conceivable that, instead of or in addition to the current detection means 107, a single shunt current detection scheme, in which a current in the AC side of the power conversion circuit 105 is detected from a DC current flowing through a shunt resistor 125 installed in the DC side of the power conversion circuit 105, is adopted. In the single shunt current detection scheme, a phenomenon, in which the current flowing through the shunt resistor 125 changes with time depending on the conduction states of the switching elements 122 included in the power conversion circuit 105, is utilized.

[Verification Method]

In the linear motor drive system according to this embodiment, there are many cases where the control unit 102 includes semiconductor integrated circuits (calculation control means) such as microcomputers or DSPs, and the functions of the control unit 102 are realized by software or the like. A method for verifying whether the control unit 102 is correctly configured or not will be explained below.

Figure 15:
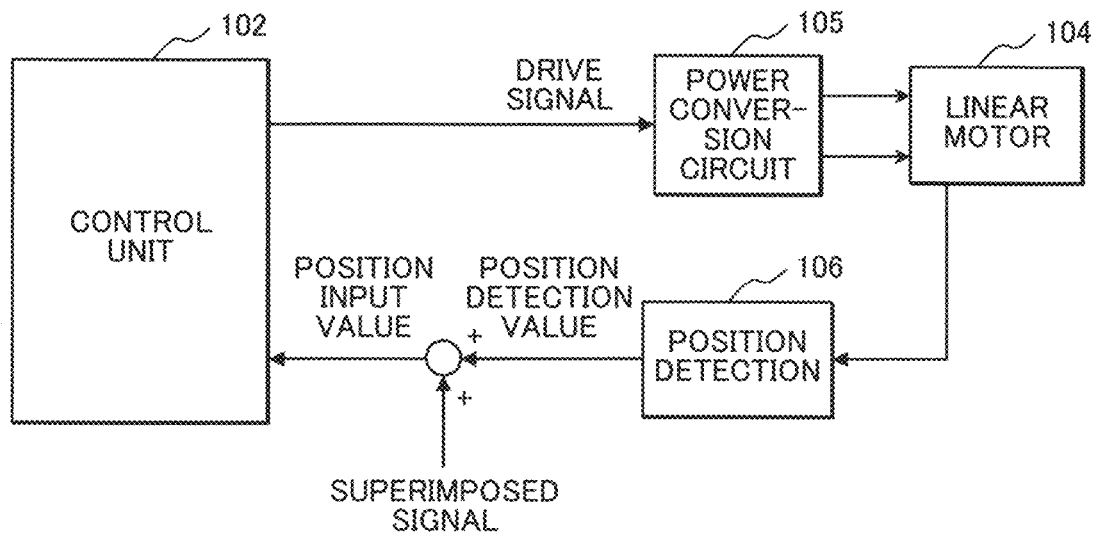
FIG. 15 is an explanatory diagram showing a configuration example used in verification.

FIG. 15 is a diagram for explaining an example of a circuit configuration for verifying the operations of the phase difference detector 130 and the drive frequency adjuster 131. As shown in FIG. 15, the circuit configuration is made so that a verifier can add a superimposed signal to the position detection value xm. Although the circuit shown in FIG. 15 is configured so that the superimposed signal is added to the output of the position detection means 106, it is also conceivable that the superimposed signal is added to the input into the position detection means 106.

Figure 16:
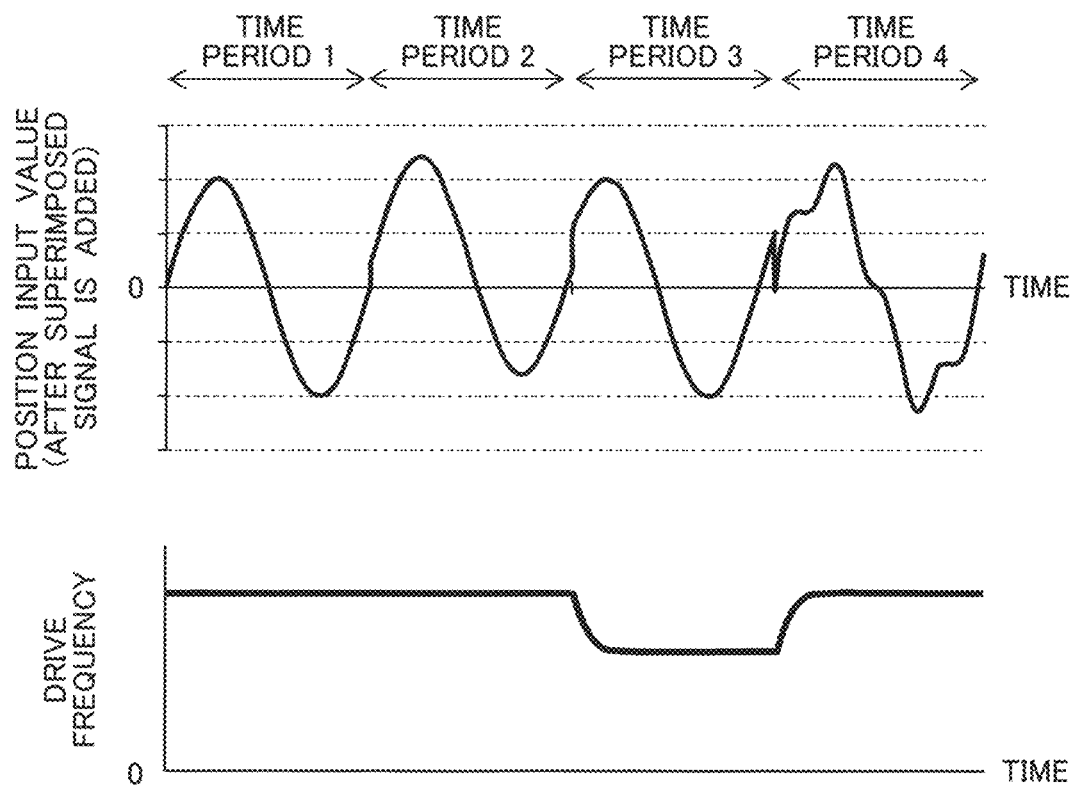
FIG. 16 is an explanatory diagram showing an example of a superimposed signal.

In this verification method, in the case where a signal, which is created by adding an after-described superimposed signal to the position detection value xm output from the position detection means 106, is input into the control unit 102, this signal is freshly referred to as a position detection value xm. FIG. 16 is a diagram for explaining the change of the position detection value xm when the superimposed signal is changed.

Time Period 1 is a time period during which any superimposed signal is not added to the output of the position detection means 130. In the case where the mover 6 performs symmetrical back-and forth movements in Time Period 1, the displacement of the mover 6 (the position detection value xm of the position detection means 106) changes in a sine wave pattern assuming that the center position of the back-and-forth movement is zero. Therefore, during Time Period 1 of FIG. 16, a waveform of a sine wave pattern is obtained as the position detection value xm. Assuming that the phase difference detector 130, which is configured as mentioned above, is used and the phase difference instruction value dltθ* is 90°, the drive frequency during Time Period 1 approaches the resonance frequency.

Time Period 2 is a time period during which a DC offset is added to the output of the position detection means 130 as a superimposed signal. Because the phase difference detector 130 has a large sensitivity only to the primary frequency component of the input AC signal xm because of using integrators or imperfect integrators having appropriate time constants, the phase difference output by the phase difference detector 130 during Time Period 2 is not so much different from the phase difference during Time Period 1. Therefore, the drive frequency hardly changes. In this case, it is preferable that the imperfect integrators should be used because the convergence time becomes shorter. In addition, it is preferable that high-pass filters should be used because the convergence time becomes shorter even if signals of lower order frequencies are added.

Time Period 3 is a time period during which a signal having the same frequency component as the drive frequency is added to the output of the position detection means 130 as a superimposed signal. When the signal having the same frequency component is superimposed, the waveform of a signal (the synthesized waveform) input into the control unit 102 has a different phase relative to the waveform of the output of the position detection means 130. In other words, the control unit 102 judges that the phase difference dltθ departs from the instruction value dltθ*, so that the drive frequency instruction value ω* is changed. Therefore, the drive frequency for the mover 6 changes, and the frequency of the detection value xm of the position detection means 106 changes. FIG. 16 shows that the drive frequency becomes lower.

Time Period 4 is a time period during which a signal having a higher order frequency than the drive frequency is added to the output of the position detection means 130 as a superimposed signal. Because the phase difference detector 130 includes the integrators 94 or the imperfect integrators 141, the phase difference detector 130 has a large sensitivity only to the primary frequency component of the input AC signal. Therefore, the phase difference output from the phase difference detector 130 during Time Period 4 is almost the same as the phase differences during Time Period 1 and Time Period 2. Therefore, owing to the change of the drive frequency executed by the drive frequency adjuster 131, the drive frequency during Time Period 4 changes to the same frequency as the frequencies during Time Period 1 and Time Period 2. In the case where a voltage V having a frequency approximately equal to the resonance frequency is applied to the mover 6, a signal having a frequency substantially higher than the resonance frequency, for example, by 10% or 20% can be considered to be a signal having a higher order frequency.

In this way, by checking a relation between the frequency of the steady state of the position detection value xm obtained during Time Period 1 and the frequencies of the position detection value xm obtained during part or all of Time Period 2 to Time Period 4, it becomes possible to verify whether or not the control unit 102 is performing control according to this example in which the drive frequency instruction value ω* is controlled using the first order Fourier coefficients. As is clear from the above description, by performing control using the Fourier expansion of the position xm of the mover and the integration value of the product of the sine of the reference phase θ* and the cosine of the reference phase θ* as shown in this example, frequency characteristics shown especially during Time Period 1, Time Period 3, and Time Period 4 can be brought about. Furthermore, by installing imperfect integrators and/or high-pass filters in the phase difference detector 130, a characteristic in response to an offset signal or a low frequency signal can be effectively brought about as shown in Time Period 2.

Here, even if a signal having the same frequency component as the drive frequency and a signal having a higher order frequency component than the drive frequency are added just after Time Period 1 as superimposed signals, a waveform that is similar to the waveforms obtained during Time Period 3 and Time Period 4 can be obtained.

[In the Case of Detent Being Large]

In the case where the detent force of the linear motor 104 (corresponding to the reluctance torque of a rotary motor) is large, there is a possibility that the phase of the applied voltage V and the phase of the motor current Im that provide the maximum efficiency are not in phase with each other. In such a case, if the phase instruction value θ* is changed to a value determined in consideration of the influence of the detent force, the above-described effect can be obtained.

In addition, if a load is large, magnetic saturation occurs at the armature 9, and the detent force of the linear motor 104 also changes. Therefore, by changing the phase instruction value θ* in accordance with the magnitude of the load, the velocity energy of the mover 6 can effectively be used even in the wide range of load condition, so that the linear motor 104 can be driven highly efficiently. The appropriate value of the phase instruction value θ* is dependent on the detent force that changes in accordance with the disposition of magnetic materials in the structures of the armature 9 and the mover 6 and the like. Consequently, it is preferable that the phase instruction value adjuster, which adjusts the phase instruction value θ* by detecting or estimating part or all of the magnetic saturation, the motor current Im, the load, and the detent force, should be provided.

Embodiment 2

The configuration of this example can be made just like that of the embodiment 1 except for the following point. In this embodiment, a resonance frequency is estimated using a motor current Im instead of detecting or estimating the position xm of a mover 6.

<Linear Motor Drive Device 201>

Figure 17:
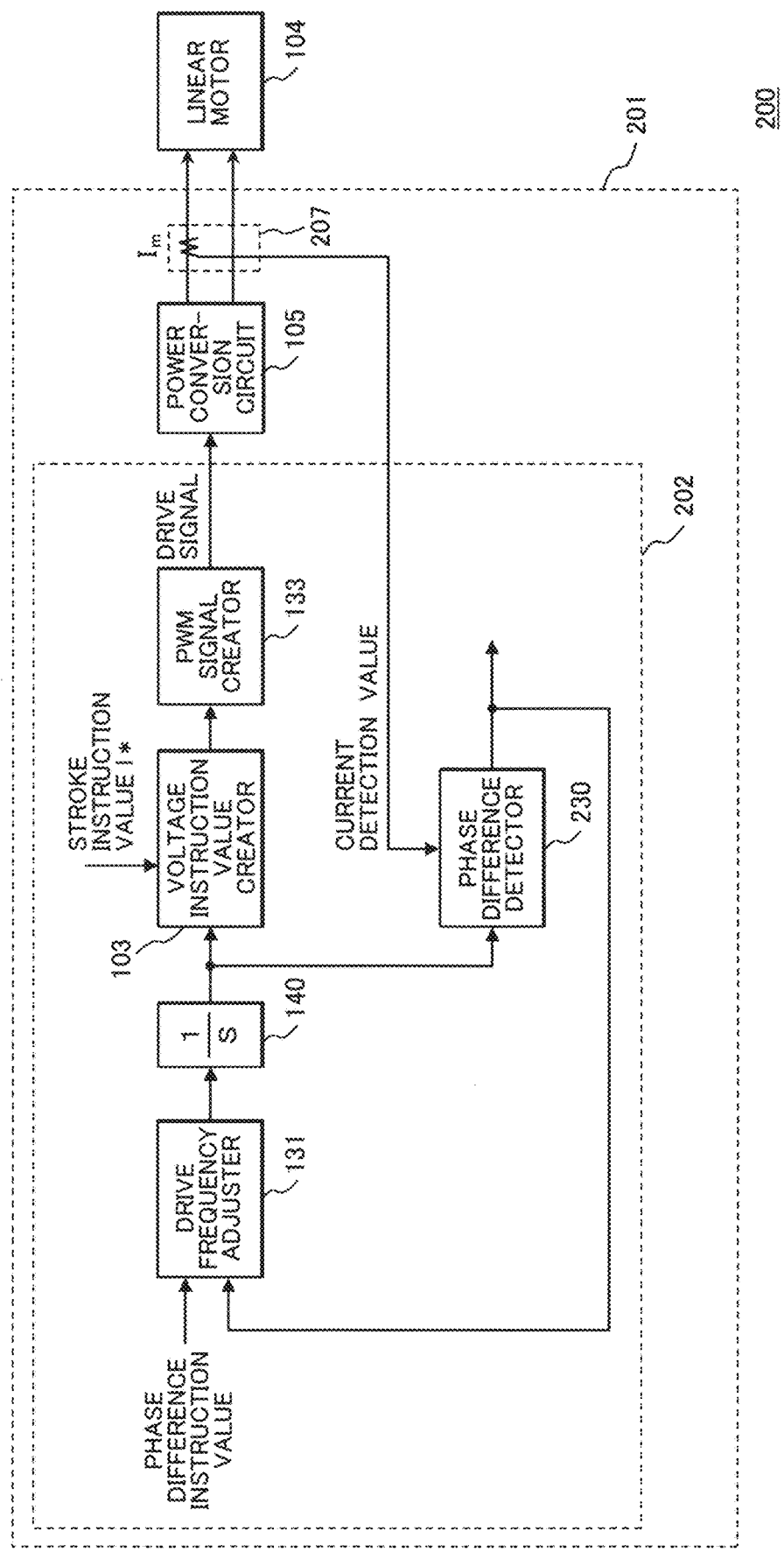
FIG. 17 is an explanatory diagram showing a configuration example of a linear motor system according to an embodiment 2.

FIG. 17 is a schematic diagram showing a linear motor system 200. The linear motor system 200 includes a linear motor drive device 201 and a linear motor 104.

The linear motor drive device 201 includes: position estimation means 208; current detection means 207; a control unit 202; a phase difference detector 230; and a power conversion circuit 105.

<Phase Difference Detector 230>

Figure 18:
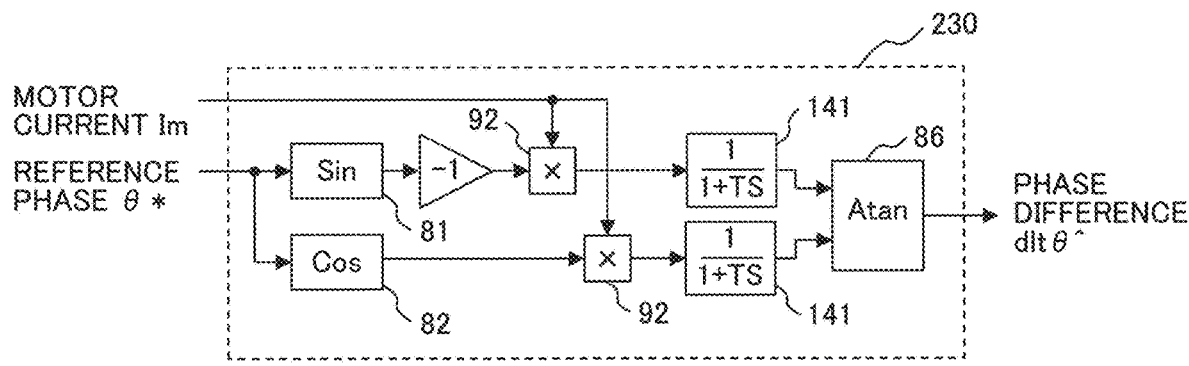
FIG. 18 is an explanatory diagram showing a configuration example of a phase difference detector according to an embodiment 2.
Figure 19:
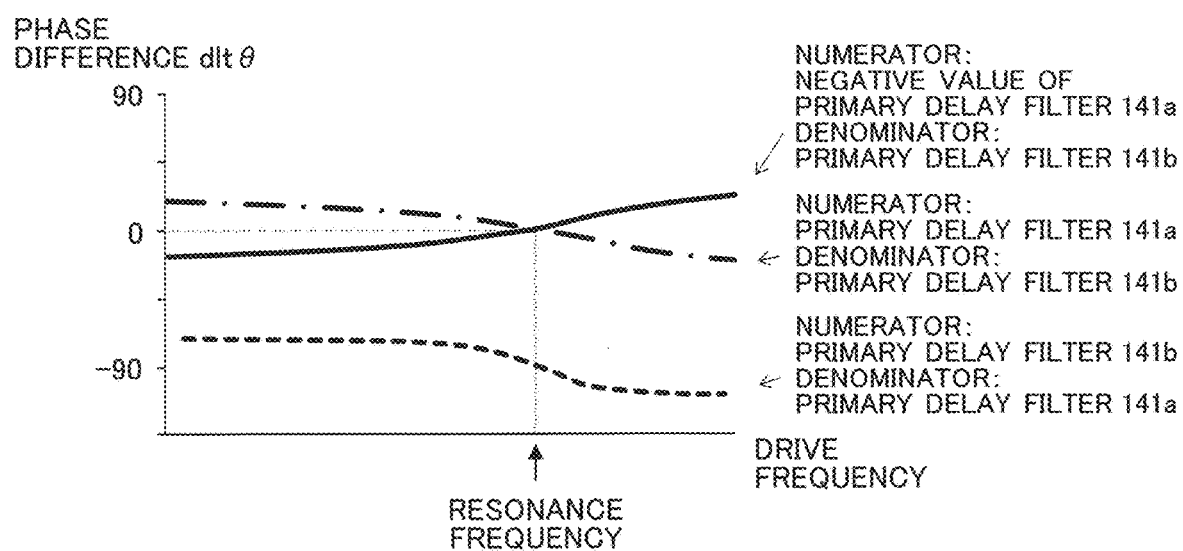
FIG. 19 is an explanatory diagram showing a relation between a drive frequency and the output of a phase difference detector according to the embodiment 2.

FIG. 18 is an explanatory diagram showing a configuration embodiment of a phase difference detector 230 according to this example, and FIG. 19 is a diagram showing a relation between the frequency of an AC voltage (the horizontal axis) and the output value of an arctangent calculator 86 (the phase difference dltθ^) (the vertical axis). A phase instruction value θ* is input to a sine calculator 81 (that outputs the sine of an input value) and to a cosine calculator 82 (that outputs the cosine of an input value) respectively, so that the sine of the phase instruction value θ* and the cosine of the phase instruction value θ* are obtained. A value obtained by multiplying the sine by the motor current Im and a value obtained by multiplying the cosine by the motor current Im are respectively output from multipliers 92. After those outputs are respectively calculated by primary delay filters 141a and 141b, the first order Fourier coefficients of the sine and cosine are respectively obtained. In other words, because the frequency components of the Fourier expansion the frequencies of which are higher than the drive frequency ω can be eliminated, the linear motor system 200 can be configured to be robust against high order noises. Reverse calculation is executed on the sign of the output of the sine calculator 81. In this embodiment, although a relation between the phase difference dltθ^ and the drive frequency corresponding to "numerator: negative value of integrator 94b, denominator: integrator 94a" is obtained, other relations can also be adopted. In this embodiment, because the reference phase θ* and the motor current Im are used, the target value dltθ* of the phase difference can be set to, for example, 0°.

The outputs of the primary delay filters 141a and 141b are input into the arctangent calculator 86. The arctangent calculator 86 output an arctangent value on the basis of the input sine and cosine components. The arctangent calculator 86 of this embodiment outputs an arctangent value of a phase having the negative value of the output of the primary delay filter 141a as a numerator and the output of the primary delay filter 141b as a denominator. It goes without saying that a value obtained by using the numerator and the denominator replaced with each other can also be usable as explained in the example 1.

As is clear from FIG. 19, even if the outputs of the primary delay filters 141a and 141b remain intact, the output value (the phase difference dltθ^) of the arctangent calculator 86 changes depending on how to combine the numerator and the denominator which are input into the arctangent calculator 86. In this embodiment, if the drive frequency is the resonance frequency, 0° is output from the arctangent calculator 86. The value output from the arctangent calculator 86 is larger than 0° if the drive frequency is higher than the resonance frequency, and the value output from the arctangent calculator 86 is smaller than 0° if the drive frequency is lower than the resonance frequency. With this, it becomes possible to calculate the phase difference dltθ^ of the primary frequency component of the input AC signal (the position xm of the mover 6 in this embodiment) that t is input into the phase difference detector 230 relative to the reference phase θ*.

As shown in this embodiment, control can also be performed with the use of the product of the sine of the reference phase θ* and the motor current Im, and the product of the cosine of the reference phase θ* and the motor current Im.

[Verification Method]

A method for verifying whether the control unit 202 is correctly configured or not will be explained below.

Figure 20:
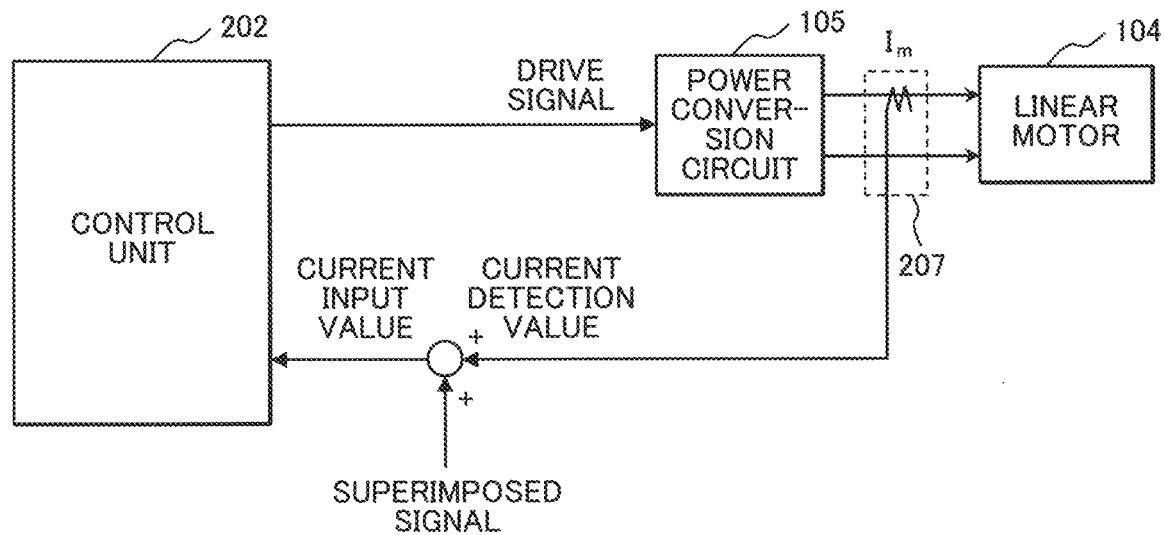
FIG. 20 is an explanatory diagram showing a configuration example used in verification according to the embodiment 2.

FIG. 20 is a diagram for explaining an example of a circuit configuration for verifying the operations of the phase difference detector 230 and the drive frequency adjuster 131. As shown in FIG. 20, this circuit is configured in such a way that a verifier can add a superimposed signal to the motor current Im. Although the circuit shown in FIG. 20 is configured so that the superimposed signal is added to the output of the current detection means 207, it is also conceivable that the superimposed signal is added to the input of the current detection means 207.

Figure 21:
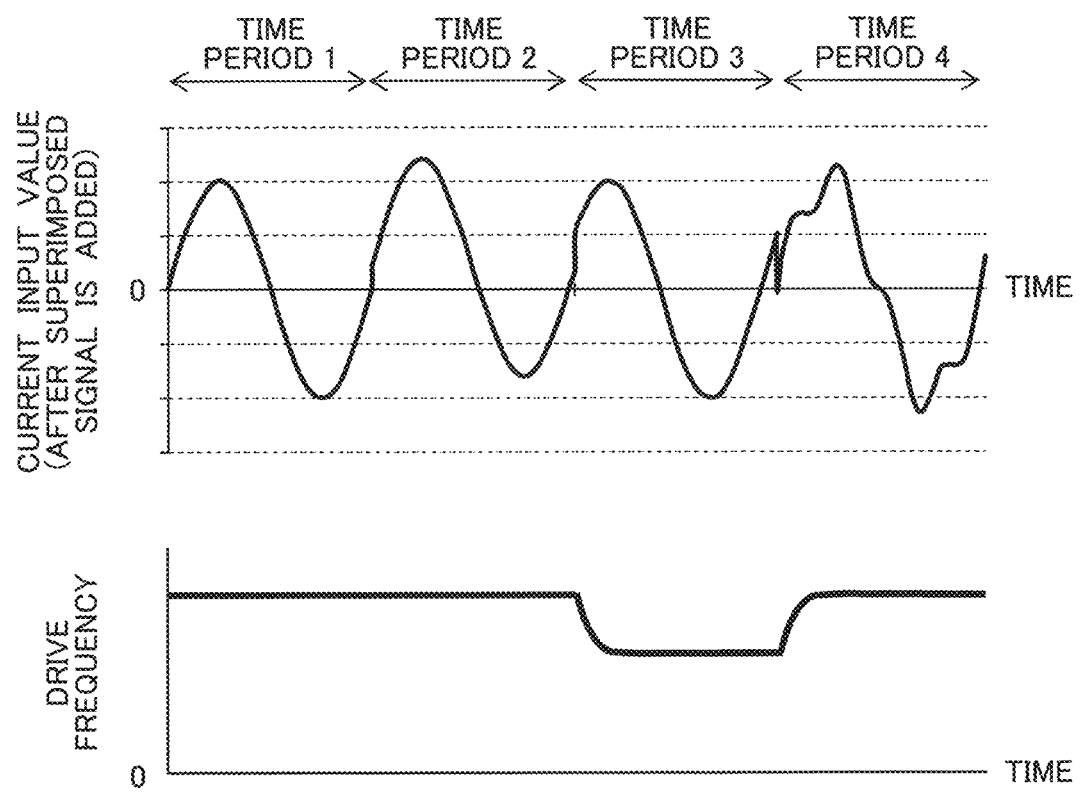
FIG. 21 is an explanatory diagram showing an example of a superimposed signal according to the embodiment 2.

In this verification method, in the case where a signal, which is created by adding an after-described superimposed signal to the motor current value Im output from the current detection means 207, is input into the control unit 202, this signal is freshly referred to as a motor current Im. FIG. 21 is a diagram for explaining the change of the motor current Im when the superimposed signal is changed. The superimposed signal can be considered to be a pseudo disturbance.

Time Period 1 is a time period during which any superimposed signal is not added to the output of the current detection means 207. In the case where the mover 6 performs symmetrical back-and forth movements in Time Period 1, the motor current Im changes in a sine wave pattern. Assuming that the phase difference detector 130, which is configured as mentioned above, is used and the phase difference instruction value dltθ* is 0°, the drive frequency during Time Period 1 approaches the resonance frequency.

Time Period 2 is a time period during which a DC offset is added to the output of the current detection means 207 as a superimposed signal. Because the phase difference detector 230 has a large sensitivity only to the primary frequency component of the input motor current Im in the case of using imperfect integrators having appropriate time constants or high-pass filters, the phase difference output by the phase difference detector 230 during Time Period 2 is not so much different from the phase difference during Time Period 1. Therefore, the drive frequency hardly changes.

Time Period 3 is a time period during which a signal having the same frequency component as the drive frequency is added to the output of the current detection means 207 as a superimposed signal. When the signal having the same frequency component is superimposed, the waveform of a signal (a synthesized signal) input into the control unit 202 has a different phase relative to the waveform of the output of the current detection means 207. In other words, the control unit 202 judges that the phase difference dltθ^ departs from the instruction value dltθ*, so that the drive frequency instruction value ω* is changed. Therefore, the drive frequency for the mover 6 changes. FIG. 21 shows that the drive frequency becomes lower.

Time Period 4 is a time period during which a signal having a higher order frequency than the drive frequency is added to the output of the current detection means 207 as a superimposed signal. Because the phase difference detector 230 includes the integrators 94 or the imperfect integrators 141, the phase difference detector 230 has a large sensitivity only to the primary frequency component of the input AC signal. Therefore, the phase difference output from the phase difference detector 230 during Time Period 4 is almost the same as the phase differences during Time Period 1 and Time Period 2. Therefore, owing to the change of the drive frequency executed by the drive frequency adjuster 131, the drive frequency during Time Period 4 changes to the same frequency as the frequencies during Time Period 1 and Time Period 2.

In this way, by checking a relation between the frequency of the steady state of the position detection value xm obtained during Time Period 1 and the frequencies of the position detection values xm obtained during part or all of Time Period 2 to Time Period 4, it becomes possible to verify whether or not the control unit 202 is performing control according to this embodiment in which the drive frequency instruction value ω* is controlled using the first order Fourier coefficients.

Embodiment 3

The configuration of this embodiment can be made just like that of the embodiment 1 or that of the embodiment 2 except for the following point. This embodiment relates to a hermetic compressor 50 as an example of an instrument on which a linear motor system 300 is mounted. As such an instrument, an instrument that provides a vibration body (a mover 6) moving back and forth with a load that changes in accordance with the phase θ and drive frequency ω of the vibration body, or the like can be used.

<Hermetic Compressor 50>

Figure 22:
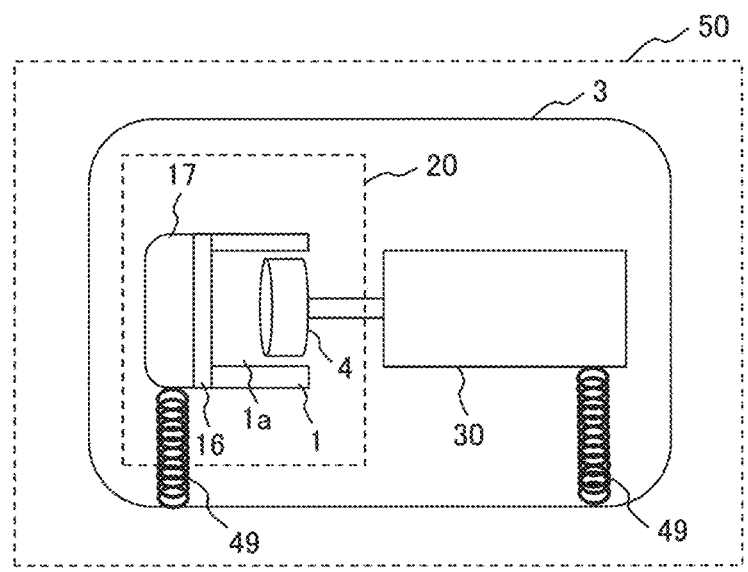
FIG. 22 is an example of a vertical cross-sectional view of a hermetic compressor.

FIG. 22 is an example of a vertical cross-sectional view of the hermetic compressor 50 including a linear motor 104. The hermetic compressor 50 is a reciprocating compressor including an airtight container 3 in which a compressed component 20 and an electromotive component 30 are disposed. The compressed component 20 and the electromotive component 30 are elastically supported by support springs 49 in the airtight container 3. The electromotive component 30 includes the mover 6 and an armature 9.

The compressed component 20 includes: a cylinder block 1 that forms a cylinder 1a; a cylinder head 16 that is assembled on one end face of the cylinder block 1; and a head cover 17 that forms a discharge chamber space. A working fluid supplied into the inside of the cylinder 1a is compressed by the back-and-forth movement of a piston 4, and the compressed working fluid is sent to a discharge pipe (not shown) which communicates with the outside of the compressor.

The piston 4 is fixed on one end of the mover 6. In this embodiment, the working fluid is compressed by the back-and-forth movement of the mover 6 and the piston 4. The compressed component 20 is disposed on one end of the electromotive component 30. The cylinder block 1 includes a guide rod, which guides the back-and-forth movement of the mover 6, along the back-and-forth direction.

In the case where the linear motor 104 is installed in the airtight container 3, connectors having airtightness, which are referred to as hermetic connectors or hermetic seals, are sometimes used. In order to retain airtightness, it is desirable that the number of the connectors should be minimum. Therefore, in the linear motor system 300 according to this embodiment, the position of the mover 6 is estimated from a voltage V applied to the linear motor 104 and a motor current Im flowing through the linear motor 104, and a resonance frequency is detected or estimated with high accuracy on the basis of the position estimation value xm^, so that high-efficiency linear motor drive is provided.

In the case where a resonance spring 23 (not shown in FIG. 22) is added to the mover 6, and the mover 6 is moved back-and-forth at a mechanical resonance frequency determined by the mass and spring constant of the mover 6, it is necessary to take the influence of the compressed component 20 on the resonance frequency into consideration. In other words, because the spring-like operation of the working fluid is added due to the pressure of the discharge space, the frequency that will be a resonance frequency changes. More specifically, the fact that the pressure of the cylinder 1a is high is equivalent to the fact that the spring constant of the resonance spring 23 added to the mover 6 is high, so that the resonance frequency becomes high. Contrarily, if the pressure of the cylinder 1a is low, the spring constant of the resonance spring 23 added to the mover 6 becomes dominant, so that the resonance frequency becomes near to the mechanical resonance frequency determined by the mass and spring constant of the mover 6.

As mentioned above, in the case where the linear motor 104 gives motive energy to the compressed component 20, the resonance frequency changes depending on the condition of the compressed component 20. In order to obtain the maximum stroke even in such a case, it is necessary to detect or estimate the resonance frequency that changes depending on the condition with high accuracy. Therefore, in the linear motor system 300 according to this embodiment, the position of the mover 6 is estimated from the voltage applied to the linear motor 104 and the current flowing through the linear motor 104, and the resonance frequency is detected or estimated with high accuracy on the basis of the position estimation value, so that high-efficiency linear motor drive can be realized.

<Linear Motor Control Device 301>

Figure 23:
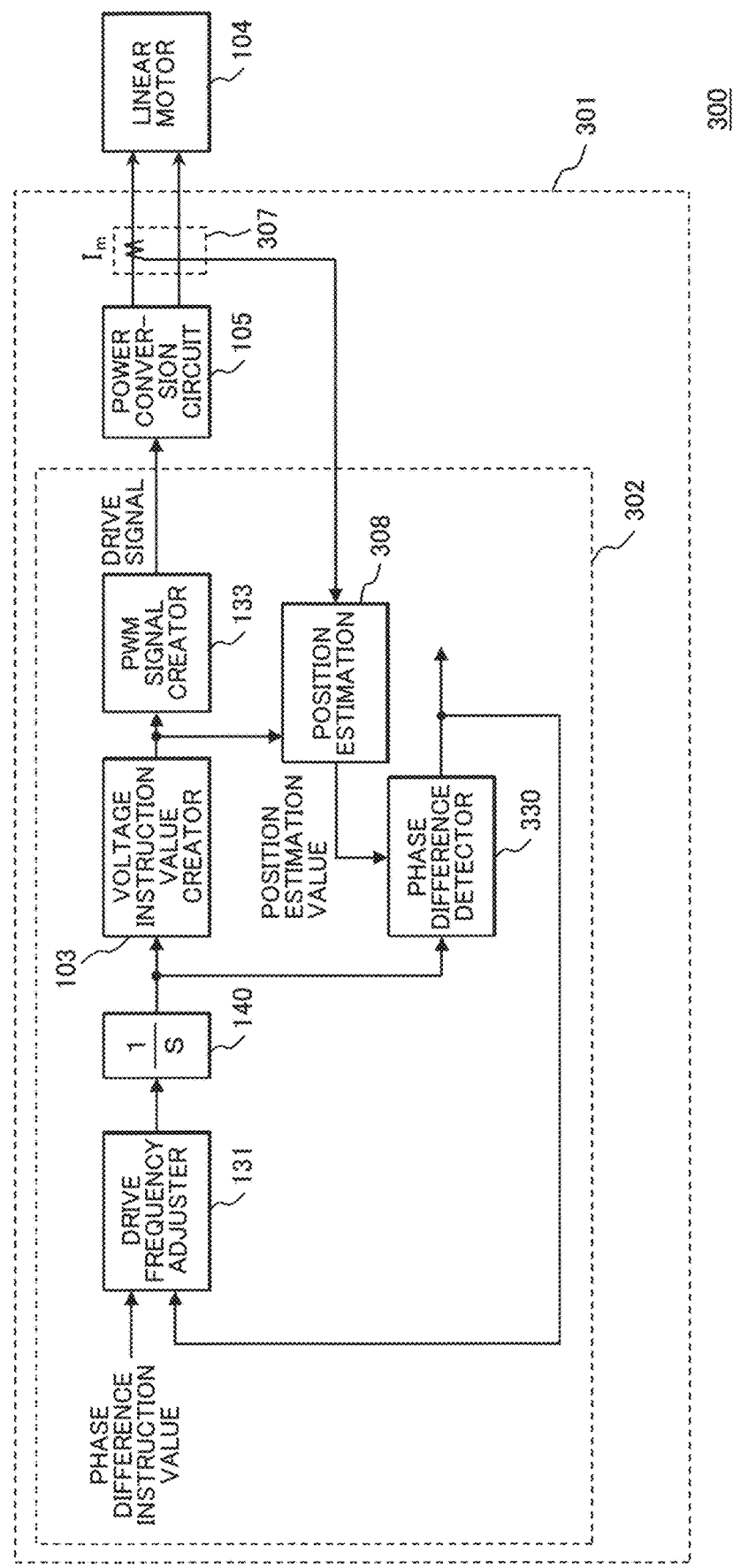
FIG. 23 is an explanatory diagram showing a configuration example of a linear motor system according to an embodiment 3.

FIG. 23 is the schematic diagram of the linear motor system 300. The linear motor system 300 includes a linear motor control device 301 and the linear motor 104.

The linear motor control device 301 includes: position estimation means 308; current detection means 307; a control unit 302; a phase difference detector 330; and a power conversion circuit 105.

<Position Estimation Means 308>

The position estimation means 308 estimates the position of the mover 6. For example, the position estimation means 308 calculates the position estimation value xm^ from the following expression using a voltage Vm* applied to the linear motor 104 and the current Im flowing through the linear motor 104.

[Expression 5]

$$\hat{x}_m = \frac{1}{K_e^*}\left\{\int (V_m^* - R_m^* \cdot I_m)dt - L_m^* \cdot I_m\right\} \quad (5)$$

In Expression 5, Vm* is a voltage instruction value Vm* to be applied to the linear motor 104. Here, it is also conceivable that the position estimation means 308 estimates the position of the piston 4 instead of the position of the mover 6.

Figure 24:
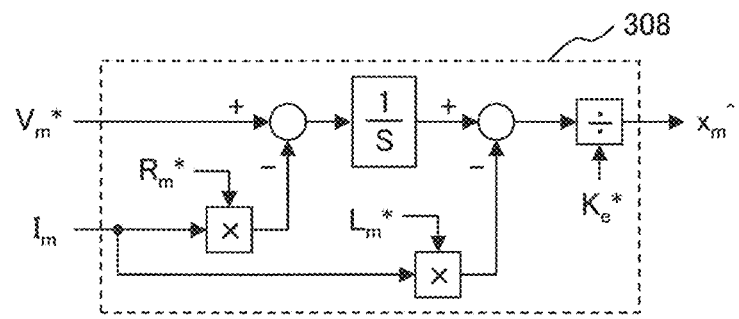
FIG. 24 is an explanatory diagram showing a configuration example of position estimation means.

FIG. 24 is an explanatory diagram showing a block diagram for materializing Expression 5. Here, the position estimation means 308 can be realized by adopting a well-known method for estimating the position of a synchronous motor instead of the above described method.

As described above, the position of the mover 6 is estimated from the voltage applied to the linear motor 104 and the current flowing through the linear motor 104, and the resonance frequency is detected or estimated with high accuracy on the basis of the position estimation value, so that high-efficiency linear motor drive can be provided.

[Verification Method]

A method for verifying whether the control unit 302 is correctly configured or not will be explained below.

Figure 25:
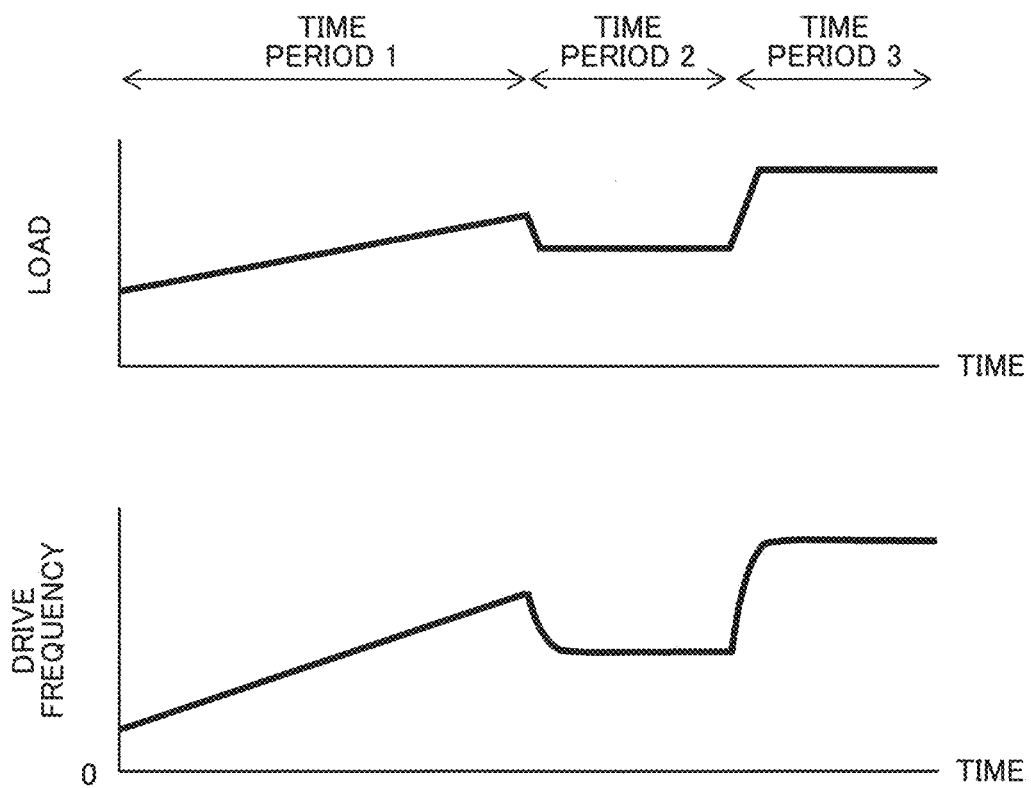
FIG. 25 is an operation explanatory diagram used in verification according to the embodiment 3.

FIG. 25 is an operation explanatory diagram of the phase difference detector 330 and a drive frequency adjuster 131, and shows the time change of the load of the compressed component 20 and the time change of the drive frequency of the linear motor 104.

When the linear motor 104 is driven, the initial value of the drive frequency is set to, for example, a resonance frequency determined the mass and spring constant of the mover 6. When the linear motor 104 is driven, the working fluid is compressed, so that the spring-like movement of the working fluid is added and the resonance frequency becomes high. Because the resonance frequency changes in accordance with the compressed state of the working fluid, the phase θ of the mover 6 departs from a reference phase θ*. Therefore, a residual error between a phase difference dltθ and a phase difference instruction value dltθ* changes. In consideration of this residual error, the drive frequency adjuster 131 changes a drive frequency instruction value ω*, and adjusts the drive frequency so that the drive frequency approaches the changed resonance frequency (a frequency higher than the initial frequency).

Time Period 1 is a time period during which the load of the compressed component 20 is gradually increased. Because the resonance frequency gradually increases along with the increase of the load, the drive frequency instruction value ω* gradually increases, and as a result, the drive frequency ω gradually increases.

Time Period 2 is a time period during which the value of the load of the compressed component 20 is kept an almost constant value smaller than the final value of the load during Time Period 1. Lowering the value of the load of the compressed component 20 causes the spring-like operation of the working fluid to be weakened, and as a result, the resonance frequency becomes lower than the final value of the resonance frequency during Time Period 1. Therefore, the drive frequency adjuster 131 adjusts the drive frequency to the changed resonance frequency (a lower frequency).

Time Period 3 is a time period during which the value of the load of the compressed component 20 is kept an almost constant value larger than the final value of the load during Time Period 1. Heightening the value of the load of the compressed component 20 causes the spring-like movement of the working fluid to be strengthened, and as a result, the resonance frequency becomes higher than the final value of the resonance frequency during Time Period 1. Therefore, the drive frequency adjuster 131 adjusts the drive frequency to the changed resonance frequency (a frequency higher than the drive frequency during Time Period 1).

As described above, by checking the change of the drive frequency along with the change of the load of the compressed component 20, it becomes possible to verify whether the control unit 202 includes a configuration compliant with this embodiment or not. According to this embodiment, the drive frequency can be increased or decreased in the same correlation as the increase or decrease of the load. In other words, control that follows a gas spring constant, which increases or decreases in accordance with the load, can be performed.

Here, as for the load of the compressed component 20, not only the pressure but also the temperature and the discharge amount can be measured instead of the load. In other words, the axis representing the load in FIG. 25 can be viewed as the axis representing the pressure, temperature, or the discharge amount. According to this embodiment, the same advantageous effect as the example 1 can be achieved.

The present invention is not limited to the above embodiments, and various modification examples can be included in the present invention. For example, the above embodiments have been described in detail in order to make the present invention easily understood, and therefore all the components described so far are not always indispensable for the present invention.

Furthermore, it is conceivable that part or the entirety of each of the above-described configurations, functions, processing units, processing procedures, and the like is realized by hardware, for example, through designing the part or entirety using integrated circuits. Alternatively, it is also conceivable that the above-described configurations, functions, and the like are realized by software through the operations of processors in which the processors interpret programs, which realize the respective functions, and executes the programs.

REFERENCE SIGNS LIST

1—Cylinder Block
1a—Cylinder
2—Permanent Magnet
3—Airtight Container
4—Piston
6—Mover
7—Magnetic Pole
8—Winding Wire
9—Armature
16—Cylinder Head
17—Head Cover
20—Compressed Component
23—Resonance Spring (Assistant Spring)
30—Electromotive Component
50—Hermetic Compressor
100—Linear Motor System
101—Linear Motor Drive Device
102—Control Unit
103—Voltage Instruction Value Creator

104—Linear Motor
105—Power Conversion Circuit
107, 207—Current detection Means
122—Switching Element
126—Full Bridge Circuit
130, 230, 330—Phase Difference Detector
131—Drive Frequency Adjuster
133—PWM Signal Creator
201, 301—Linear Motor Control Device

The invention claimed is:

1. A compressor including an armature having magnetic poles and winding wires; a mover having a permanent magnet; a power conversion unit that outputs AC power to the winding wires, in which the mover and the armature are movable relative to each other, the mover or the armature is connected to an elastic body and a piston, and the piston compresses a fluid and a load caused by compressing the fluid changes in accordance with a phase or a drive frequency of the mover or the armature, the compressor comprising:
  a position detection unit that detects and outputs a position of the mover or a position of the piston with respect to the armature, or a position estimation unit that estimates and outputs the position of the mover or the position of the piston with respect to the armature; and
  a control unit that controls an output of the power conversion unit based on an output of the position detection unit or an output of the position estimation unit,
  wherein the load is measured as pressure, temperature or discharge amount of the fluid and a frequency of the AC power is increased or decreased in correlation with the increase or decrease of the load, and
  wherein the frequency of the AC power is controlled using an arctangent of a ratio of Fourier coefficients of the position of the mover with respect to the armature.

* * * * *